US008337130B2

(12) United States Patent
Nagayama

(10) Patent No.: US 8,337,130 B2
(45) Date of Patent: Dec. 25, 2012

(54) T-NUT

(75) Inventor: Yutaka Nagayama, Kishiwada (JP)

(73) Assignee: Nagayama Electric Co., Ltd., Kinokawa-shi (JP)

( * ) Notice: Subject to any disclaimer, the term of this patent is extended or adjusted under 35 U.S.C. 154(b) by 0 days.

(21) Appl. No.: 13/329,821

(22) Filed: Dec. 19, 2011

(65) Prior Publication Data

US 2012/0288345 A1    Nov. 15, 2012

(30) Foreign Application Priority Data

May 12, 2011  (JP) .................................. 2011-107387

(51) Int. Cl.
*A47G 3/00* (2006.01)
(52) U.S. Cl. ........................................ 411/374; 411/179
(58) Field of Classification Search .............. 411/372.5, 411/372.6, 373, 374, 179, 377, 431
See application file for complete search history.

(56) References Cited

U.S. PATENT DOCUMENTS

| 4,900,206 A | * | 2/1990 | Kazino et al. ................. 411/377 |
| 5,429,466 A | * | 7/1995 | Nagayama .................... 411/179 |
| 5,918,738 A | * | 7/1999 | Leistner ........................ 206/344 |
| 7,775,754 B2 | * | 8/2010 | Calandra et al. ................. 411/5 |

FOREIGN PATENT DOCUMENTS

| JP | 2004-017250 A | 1/2004 |
| JP | 2006-183798 A | 7/2006 |
| JP | 2007-016961 A | 1/2007 |
| JP | 2010-101312 A | 5/2010 |
| JP | 2010-101372 A | 5/2010 |

* cited by examiner

*Primary Examiner* — Gary Estremsky
(74) *Attorney, Agent, or Firm* — Westerman, Hattori, Daniels & Adrian, LLP

(57) ABSTRACT

A T-nut includes a cylindrical shaft section that opens at both ends and includes an internal thread at an inner peripheral surface thereof; a flange that extends outwardly from a first end portion of the shaft section; and a sealing member that seals the first-end-portion-side opening of the shaft section, and is formed of elastomeric resin. The sealing member includes a circular cylindrical portion and a dome-shaped cover, the circular cylindrical portion closely contacting the inner peripheral surface and opening at a first-end-portion side, the cover being formed continuously to an edge of the circular cylindrical portion at a second-end-portion side, a top of the cover facing the second-end-portion side, an outer peripheral surface of the circular cylindrical portion having an externally threaded long-and-narrow protruding portion that seals a space at a root of the internal thread.

13 Claims, 22 Drawing Sheets

Fig. 3
(a) 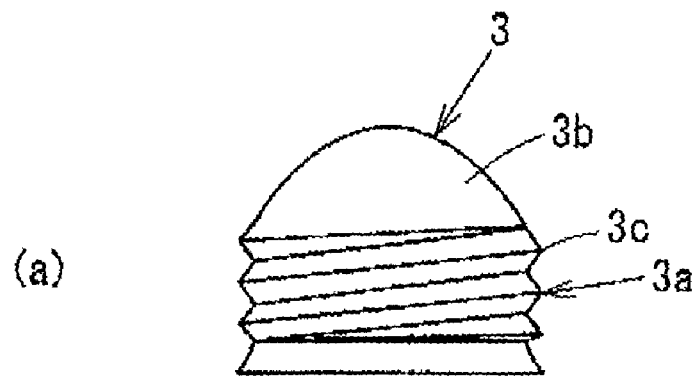
(b) 
(c) 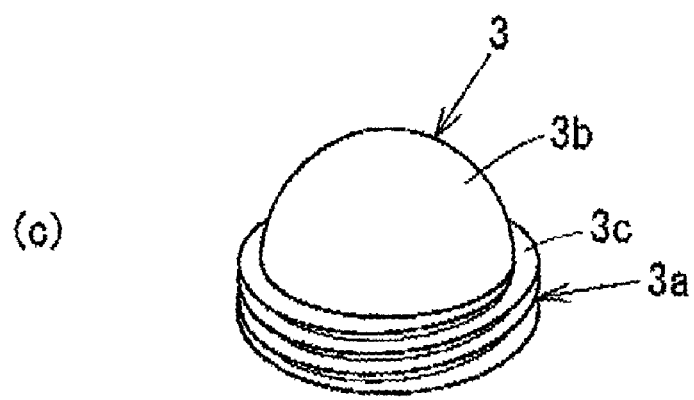

Fig. 6
(a)
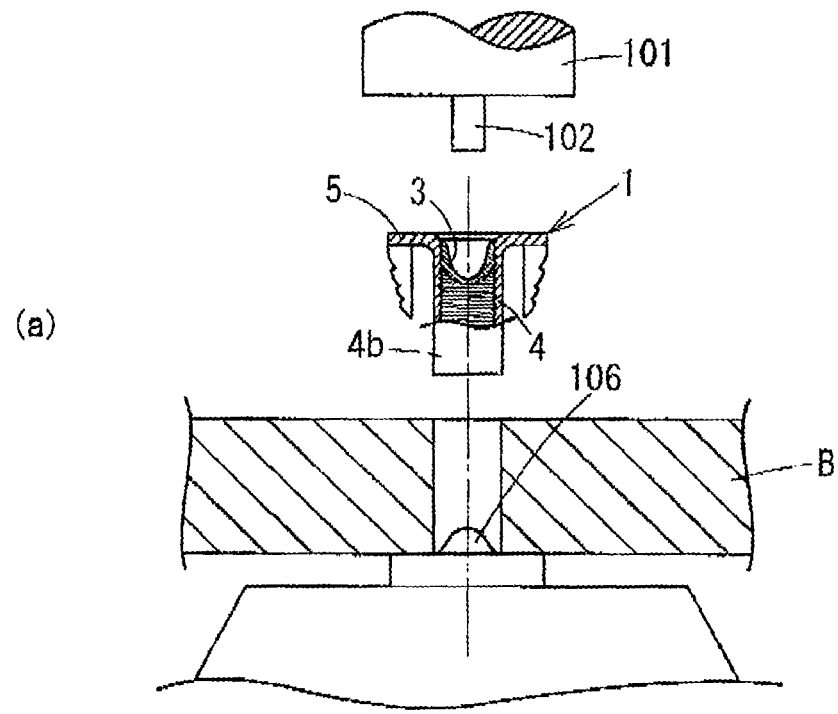
(b)
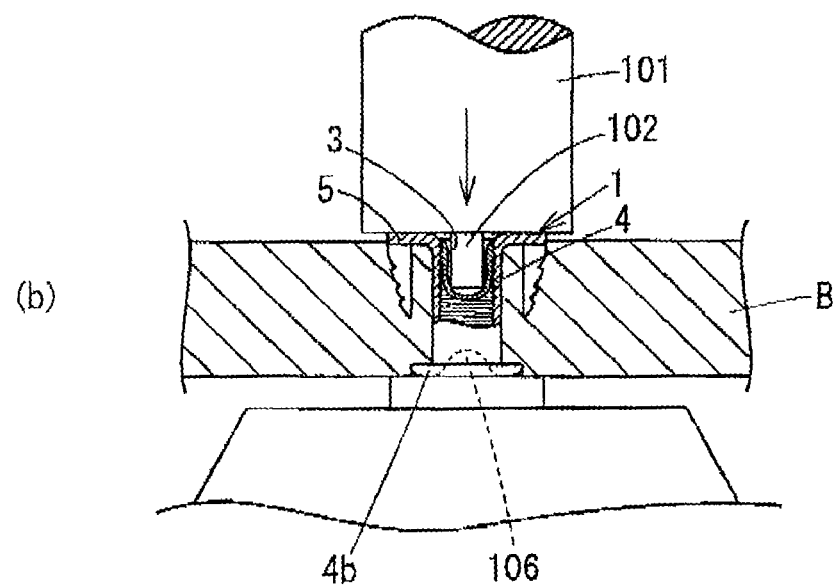

Fig. 9
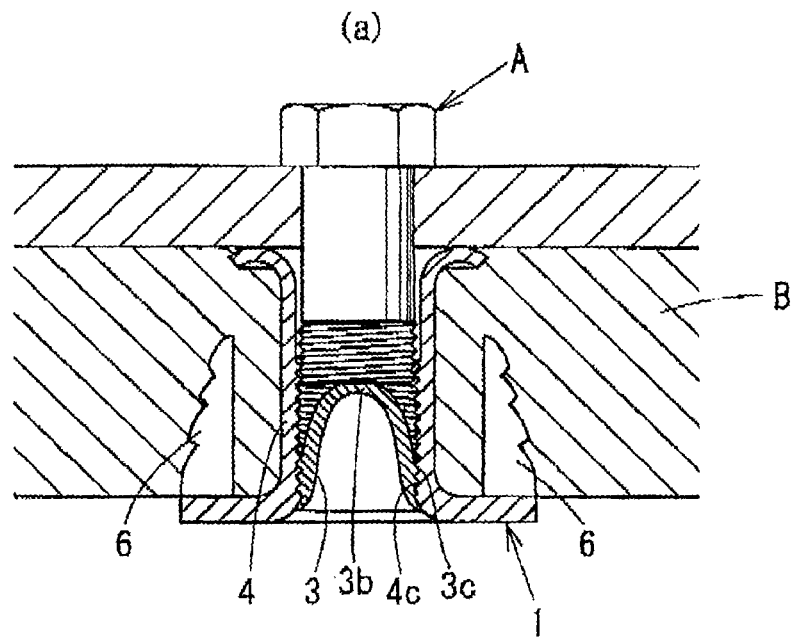
(a)
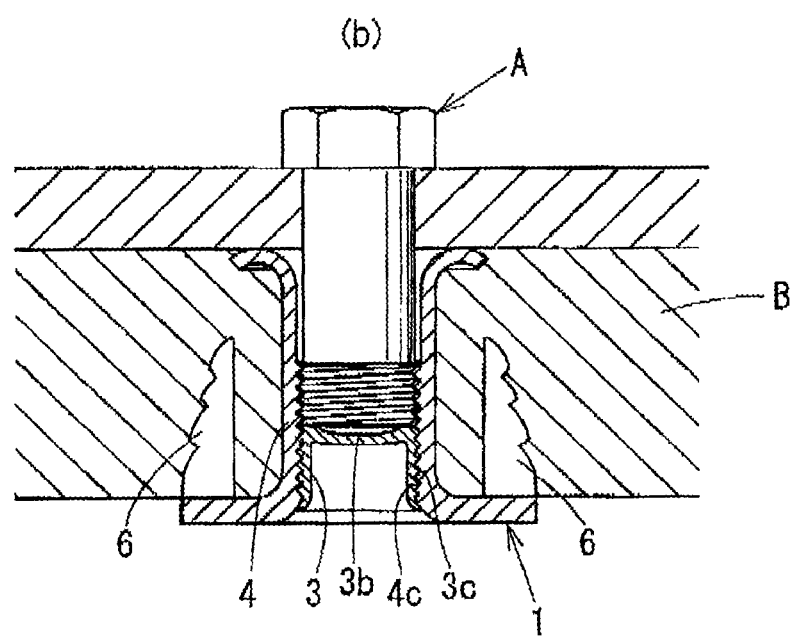
(b)

Fig. 12
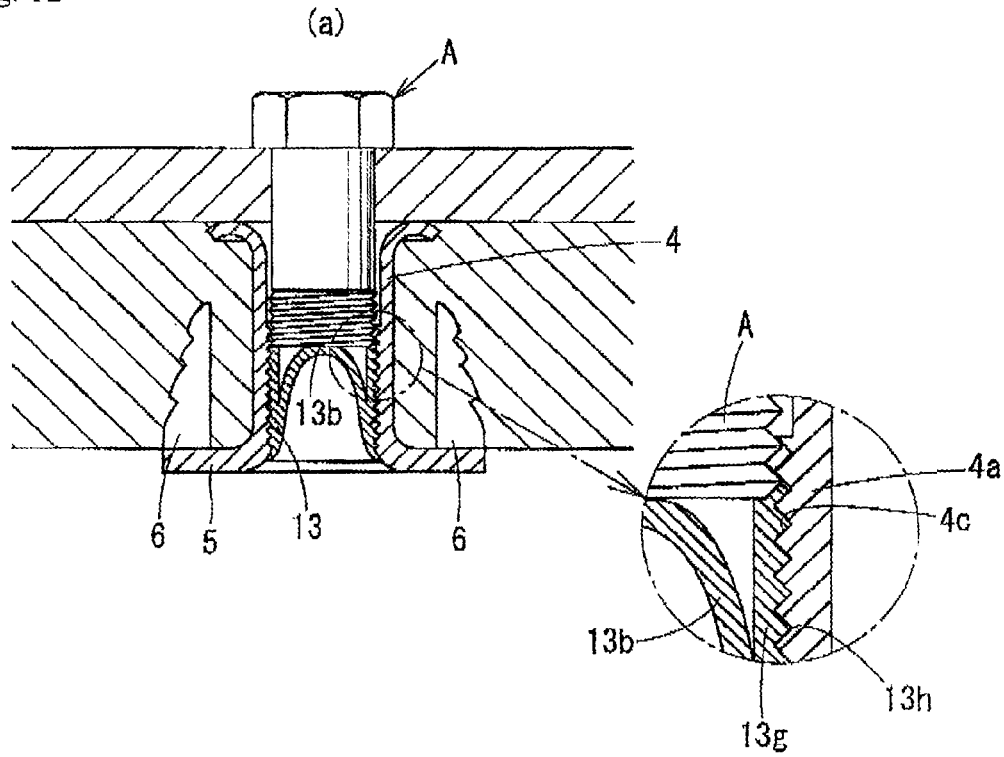
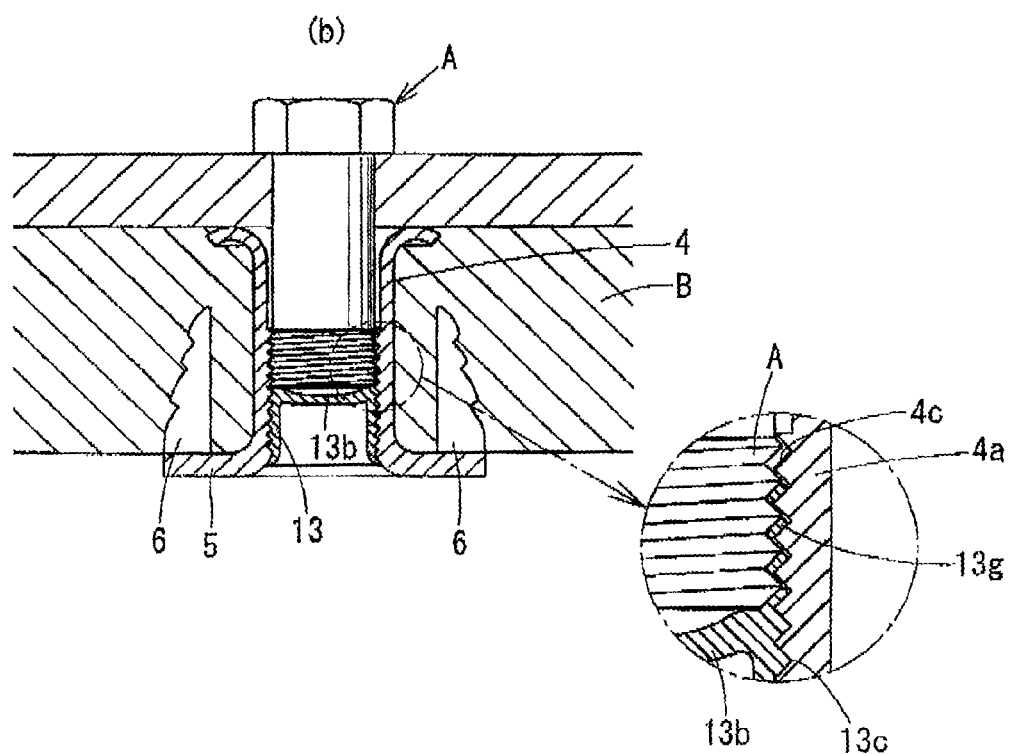

Fig. 13
(a) 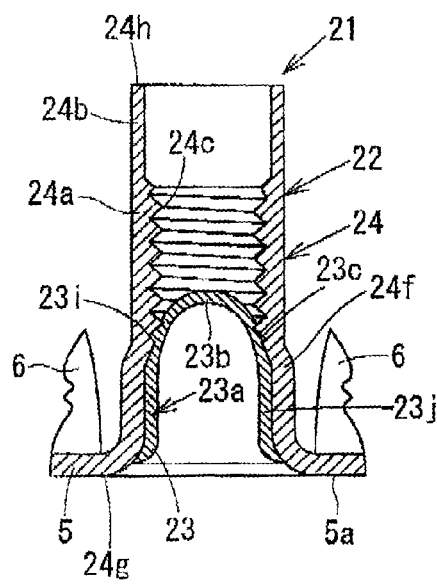
(b) 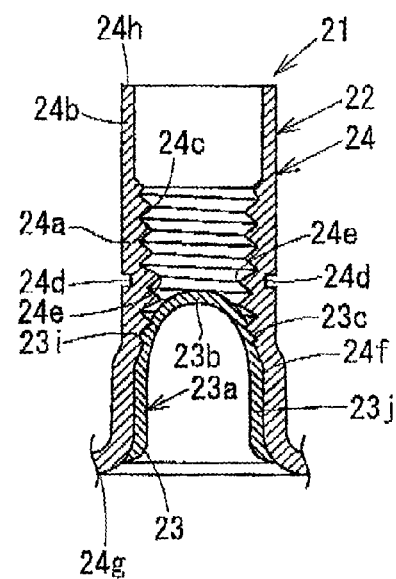
(c) 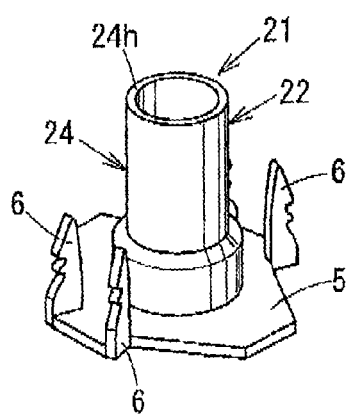
(d) 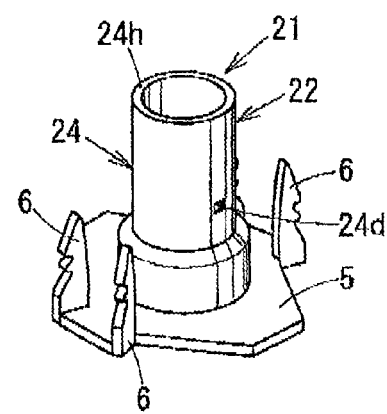

Fig. 14
(a) 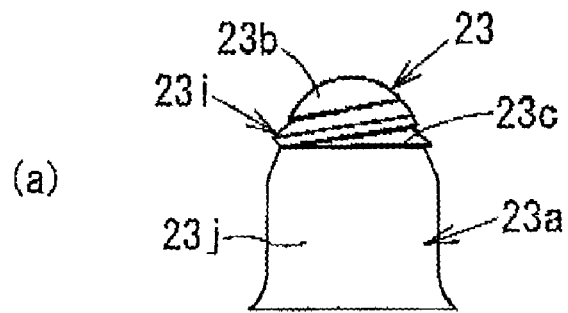
(b) 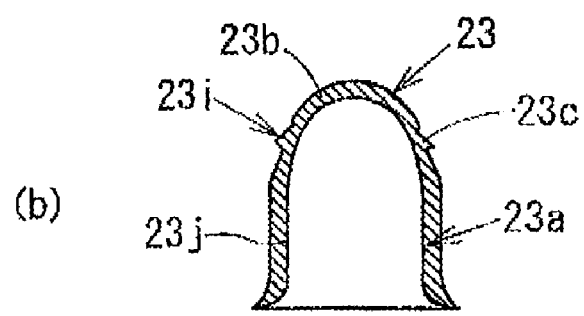
(c) 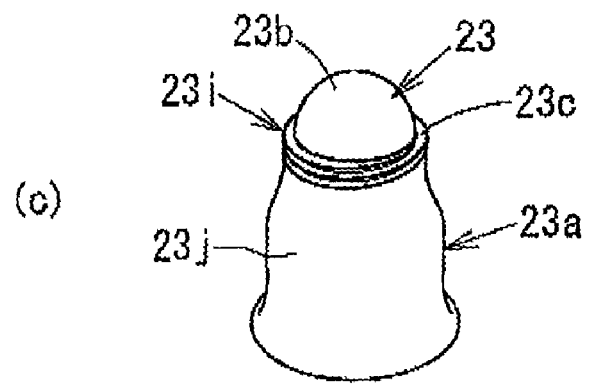

Fig. 16
(a) 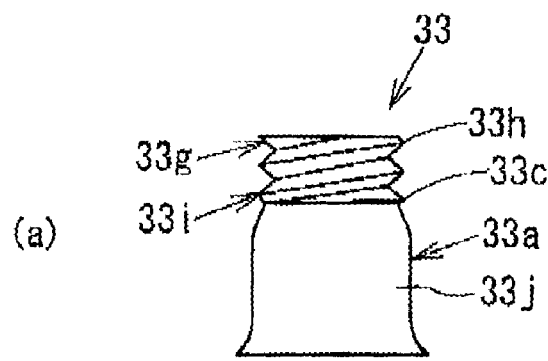
(b) 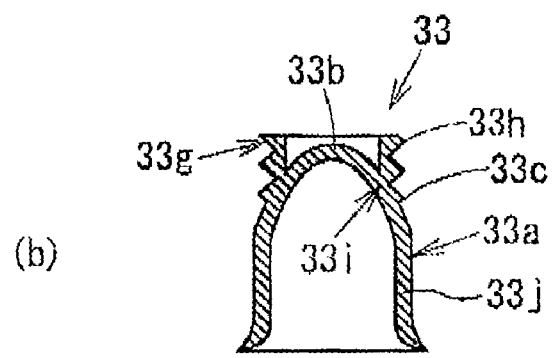
(c) 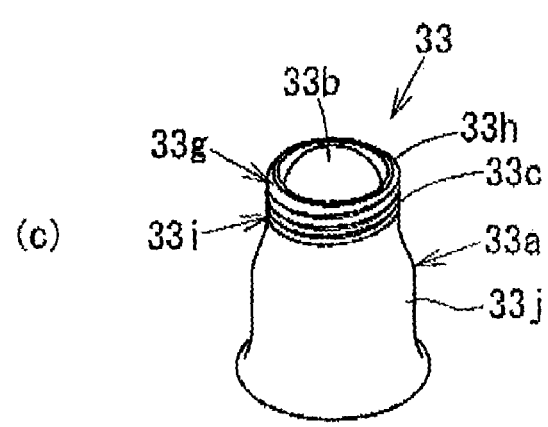

Fig. 18
(a)
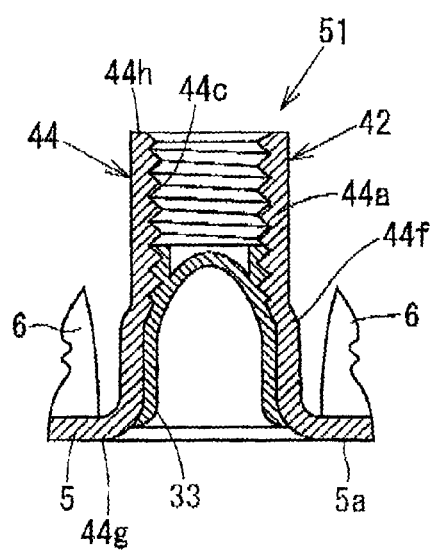
(b)
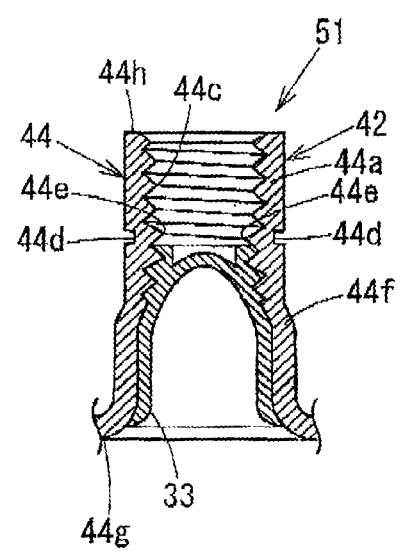

Fig. 21
(a)
(b)
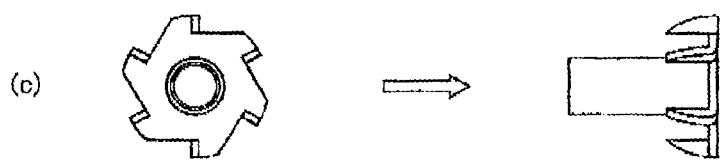
(c)
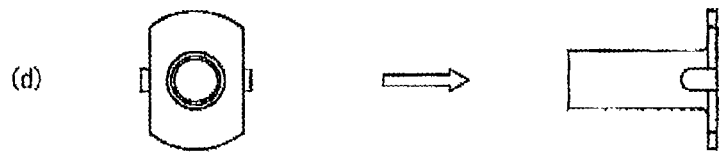
(d)
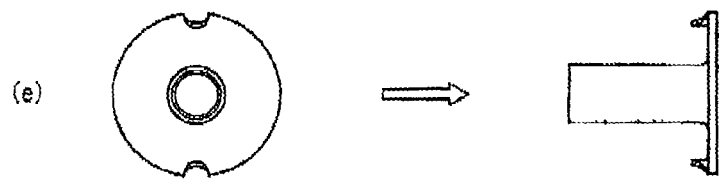
(e)
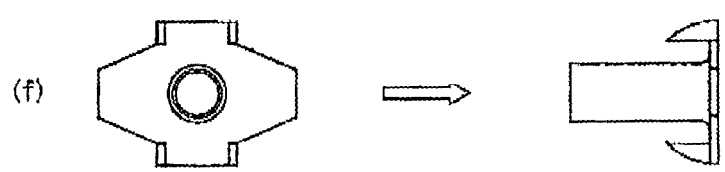
(f)

T-NUT

BACKGROUND OF THE INVENTION

1. Field of the Invention

The present invention relates to a T-nut including a sealing member that prevents entry of, for example, a coating, oil, molten resin, or foreign matter into a shaft section.

2. Description of the Related Art

Hitherto, when, after driving a T-nut into, for example, a plate material, polyurethane foam is formed on the plate material, or, for example, the plate material is immersed in oil or a coating for coating or surface treatment thereof, if molten resin, the coating, the oil or the like enters a shaft section of the T-nut and adheres to internal threads, the substance that has entered is meshed at locations between the threads. This is an obstacle to screwing the T-nut. Therefore, various measures are taken to prevent the molten resin or the like from entering the shaft section.

For example, Japanese Unexamined Patent Application Publication No. 2004-17250 (Patent Document 1) proposes a taped T-nut in which an opening of the T-nut at a side of a first end portion is closed with an adhesive tape. Japanese Unexamined Patent Application Publication No. 2006-183798 (Patent Document 2) proposes a T-nut in which an inner flange that closes an opening at a side of a first end portion is integrally formed using a metallic material that is the same as that forming a shaft section and an outer flange. Japanese Unexamined Patent Application Publication No. 2010-101372 (Patent Document 3) proposes, as shown in FIGS. 23A and 23B, a T-nut 10 in which an opening at a side of a first end portion is sealed with a solid sealing member 10a that is formed of, for example, resin and that has a substantially disc shape.

When conventional T-nuts are driven into a plate or a plate material (such as a table), a driving device, such as that shown in FIGS. 4A and 4B, is used. In this type of driving device, in order to prevent lateral displacement of the T-nut that is being driven into, for example, a plate, a guide pin 102 is provided at an end of a bush bar 101 for driving the T-nut into the plate. The driving device is formed so as to prevent lateral displacement of the T-nut by inserting the guide pin 102 into a shaft section from a one-end-side opening of the T-nut.

SUMMARY OF THE INVENTION

However, when the T-nut discussed in each of Patent Documents 1 and 3 is driven into, for example, a plate using a driving device including a guide pin, the guide pin strikes an adhesive tape or a sealing member, causing the adhesive tape or sealing member to be torn or to move into the shaft section. In the T-nut discussed in Patent Document 2, the guide pin may strike and deform the inner flange of the T-nut, and may strike and damage the metallic inner flange.

Therefore, in order to drive the T-nut discussed in each of Patent Documents 1 to 3 into, for example, a plate, it is necessary to use a driving device provided with a different unit for preventing lateral displacement of the T-nut instead of a guide pin. Separately providing such a driving device in addition to a conventional driving device including a guide pin greatly burdens workers driving T-nuts into, for example, the plate.

According to an aspect of the present invention, there is provided a T-nut including a cylindrical shaft section that is integrally formed using a metallic material, the shaft section having a first end portion and a second end portion opposite to the first end portion, the shaft section having a first-end-portion-side opening at the first end portion and a second-end-portion-side opening at the second end portion, the shaft section including an internal thread at an inner peripheral surface thereof; a flange that extends outwardly from the first end portion of the shaft section; and a sealing member that seals the first-end-portion-side opening of the shaft section, the sealing member being formed of elastomeric resin. The sealing member includes a circular cylindrical portion and a dome-shaped cover, the circular cylindrical portion closely contacting the inner peripheral surface of the shaft section and opening at a first-end-portion side, the dome-shaped cover being formed continuously to an edge of the circular cylindrical portion at a second-end-portion side, a top of the dome-shaped cover facing the second-end-portion side, an outer peripheral surface of the circular cylindrical portion having an externally threaded long-and-narrow protruding portion that seals a space at a root of the internal thread. When the flange at the first-end-portion side of the shaft section is defined as an upper side, and the second-end-portion side of the shaft section is defined as a lower side, an upper edge of the sealing member is positioned in a same plane as an upper end surface of the flange or is positioned below the upper end surface of the flange.

Accordingly, the sealing member of the T-nut according to the present invention includes a circular cylindrical portion having an opening at the side of the first end portion, and a dome-shaped cover. This means that the sealing member has an internal space including the opening at the side of the first end portion. Therefore, when the T-nut is driven into, for example, a plate material using a driving device, it is possible to accommodate a guide pin (used for preventing lateral displacement of the shaft section) in the internal space, and to drive the T-pin into, for example, the plate material using a driving device including a guide pin.

The sealing member of the T-nut according to the present invention is formed of elastomeric resin. Therefore, even if the guide pin is long and comes into contact with an inner surface of the sealing member, the sealing member is resiliently deformed when the sealing member is pushed by the guide pin, thereby making it possible to widen the internal space and accommodate the guide pin therein. Further, in the T-nut according to the present invention, even if an end of a bolt that is screwed into the shaft section from the side of the second end portion comes into contact with the sealing member, the sealing member is resiliently deformed, thereby making it possible to suppress falling off of and displacement of the sealing member from the shaft section.

The T-nut according to the present invention includes an externally threaded long-and-narrow protruding portion provided at the outer peripheral surface of the circular cylindrical portion. By fitting the protruding portion into the valley of the internal thread provided at the inner peripheral surface of the shaft section, it is possible to suppress displacement of the sealing member in the direction of a shaft center of the shaft section. By sealing the space at the root of the internal thread with the externally threaded long-and-narrow protruding portion, it is possible to increase the sealability of the sealing member and to suppress entry of, for example, molten resin from the opening in the direction of the first end portion.

In the T-nut according to the present invention, when the first-end-portion side of the shaft section is defined as the upper side, and the second-end-portion side of the shaft section is defined as the lower side, the upper edge of the sealing member is positioned in the same plane as the upper end surface of the flange or is positioned below the upper end surface of the flange, and the upper side of the sealing member is open. Therefore, when the T-nut is transported by a transport chute of a driving device, it is possible to either eliminate or make very small the area in which the sealing member comes into contact with an inner wall of the chute. Consequently, it is possible to considerably reduce friction between the T-nut and the inner wall of the chute, to smoothly transport the T-nut, and to suppress a reduction in the sealability of the T-nut occurring when the sealing member is positionally displaced by friction between the sealing member and the inner wall of the chute during the transport of the T-nut.

It is desirable that the sealing member further include an outer cylindrical portion that extends to the second-end-portion side from a second-end-portion-side edge of the circular cylindrical portion, and that surrounds an outer periphery of the cover. Here, an outer peripheral surface of the outer cylindrical portion includes an externally threaded long-and-narrow protruding portion that seals the space at the root of the internal thread. When a bolt is screwed from the second-end-portion-side opening of the shaft section, the outer cylindrical portion is meshed between the internal thread and the bolt.

Accordingly, the sealing member includes such an outer cylindrical portion, and the outer peripheral surface of the outer cylindrical portion is provided with an externally threaded long-and-narrow protruding portion that seals the space at the root of the internal thread. Therefore, it is possible to increase the sealability of the sealing member. By causing the outer cylindrical portion to be meshed between the bolt and the internal thread of the shaft section, it is possible to suppress loosening of the bolt.

It is desirable that the sealing member have a protrusion at an inner surface thereof. This makes it possible to correct the displacement of the sealing member by putting an end of the finger on the protrusion when the sealing member is displaced.

It is desirable that the cover of the sealing member has a protrusion at an outer surface thereof. When the protrusion is provided, it is possible to suppress loosening of the bolt by friction force that is generated between the protrusion (provided at the outer surface of the cover) and an end of the bolt when the protrusion comes into contact with the end of the bolt.

According to another aspect of the present invention, there is provided a T-nut including a cylindrical shaft section that is integrally formed using a metallic material, the shaft section having a first end portion and a second end portion opposite to the first end portion, the shaft section having a first-end-portion-side opening at the first end portion and a second-end-portion-side opening at the second end portion, the shaft section including an internal thread at an inner peripheral surface thereof; a flange that extends outwardly from the first end portion of the shaft section; and a sealing member formed of a thin film of elastomeric resin, and sealing the first-end-portion-side opening of the shaft section. The sealing member is resiliently deformable so that an external member that inserted into the shaft section from a first-end-portion side for preventing lateral displacement of the shaft section when the T-nut is driven into a drive material is accommodated in the shaft section.

The sealing member is formed of a thin film of elastomeric resin, and is resiliently deformable so that the external member, such as a guide pin, that is inserted into the shaft section from the first-end-portion side for preventing lateral displacement of the shaft (of the T-nut) when the shaft section is driven into a drive material is accommodated in the shaft section. Therefore, it is possible to suppress damage to the sealing member when, for example, the guide pin strikes the sealing member; to suppress coming off of an adhered portion where the sealing member adheres to the flange and shaft section of the T-nut; and to suppress loss of the sealability of the T-nut.

When the first-end-portion side is defined as an upper side, and a second-end-portion side is defined as a lower side, it is desirable that the sealing member formed of the thin film seal the first-end-portion-side opening of the shaft section as a result of causing the sealing member to adhere to an upper end surface of the flange. This makes it possible to simplify the shape of the sealing member, and to easily cause the sealing member to adhere to the T-nut.

The sealing member formed of the thin film may seal the first-end-portion-side opening of the shaft section as a result of causing the sealing member to adhere to the inner peripheral surface of the shaft section. This makes it possible to accommodate the sealing member in the shaft section; to smoothly transport the T-nut by preventing the sealing member from contacting the inner wall of the transport chute; and to suppress loss of sealability of the T-nut occurring when the sealing member is displaced by friction force between the sealing member and the inner wall of the transport chute during the transport of the T-nut.

It is desirable that the shaft section have a recessed portion at an outer peripheral surface thereof, the recessed portion being for causing a portion of the internal thread to be irregular. This makes it possible to suppress loosening of the bolt by causing the external thread of the bolt that is screwed into the T-nut to move onto the irregular portion of the internal thread.

In the T-nut according to the present invention, the flange may include a claw or a protrusion extending from the first end portion to the second end portion.

In the T-nut according to the present invention, at least a portion of an outer peripheral edge of the flange may be formed by a straight line as viewed from the first-end-portion side. In the T-nut according to the present invention, the flange may be square-shaped or rectangular as viewed from the first-end-portion side. In the T-nut according to the present invention, the flange may be circular or elliptical as viewed from the first-end-portion side.

In the T-nut according to the present invention, as viewed from the first-end-portion side, the flange may include a substantially octagonal central portion, and a pair of extending portions that extend outwardly from a pair of end sides at the central portion opposing each other in a first radial direction of the shaft section with the shaft section at the central portion being interposed therebetween. Here, as viewed from the first-end-portion side, the extending portions each include a pair of straight sides, each straight side extending outwardly from an end of the corresponding end side, and a straight line or an inwardly curved side connecting outer end points of the corresponding straight sides. The extending portions of the flange include two pairs of claws, or a total of four claws. Each pair of claws is formed so as to extend from the corresponding pair of straight sides to a/the second-end-portion side by cutting and raising an/the outer peripheral edge of the flange. The four claws are symmetrically disposed in the first radial direction and a second radial direction that is orthogonal to the first radial direction with the shaft section 4 being disposed therebetween.

In the present invention, as viewed from the second-end-portion side, the two pairs of pawls, or the four pawls, may be disposed so that two rows of claws, each row including two claws, are provided with a widthwise direction being substantially parallel to the first radial direction.

In the present invention, the shaft section may include an intended-for-caulking portion at a/the second-end-portion side, the intended-for-caulking portion being intended to be caulked with respect to a drive material, the intended-forcaulking portion being thinner than a portion where the internal thread is formed in the inner peripheral surface of the shaft section.

In the present invention, the shaft section may include, at the first-end-portion side, a diameter increasing portion where a diameter of an outer peripheral surface and/or the inner peripheral surface increases. In the present invention, the internal thread of the shaft section may be formed along an entire length of the inner peripheral surface of the shaft section.

Here, "circular cylinder" refers to a cylinder that is circular in cross section that is perpendicular to the shaft core, and refers not only to a cylinder whose outside diameter and inside diameter in cross section are constant, but also to a cylinder whose outside diameter and/or inside diameter changes in an axial direction. "Externally threaded long-and-narrow protruding portion" may or may not have the capability of being screwed into the internal thread as long as it functions to seal the space at the root of the internal thread of the shaft section. "In the shaft section" refers to an internal portion of a hole extending through the shaft section, and to an internal portion of a hole extending through the flange so as to be continuous to the hole of the shaft section. "Inner peripheral surface of the shaft section" refers to the inner peripheral surface of the hole extending through the shaft section, and to the inner peripheral surface of the hole extending through the flange so as to be continuous to the hole of the shaft section. "Straight line" refers to a line that is slightly deformed from a straight line due, for example, processing strain. "Widthwise direction" of the claw refers to a direction that is perpendicular to the protruding direction and the thickness direction of the claw.

As described above, according to the T-nut of the present invention, it is possible to obtain high sealability and to suppress coming off of and displacement of the sealing member occurring when the guide pin or bolt contacts the sealing member. Therefore, it is possible to effectively suppress entry of, for example, molten resin or a coating into the shaft section of the T-nut.

BRIEF DESCRIPTION OF THE DRAWINGS

FIGS. 3A to 3C are, respectively, a side view, a sectional view, and a perspective view of a sealing member of the T-nuts shown in FIGS. 1A to 1D;

FIGS. 6A and 6B are schematic views showing driving of a T-nut according to the present invention into, for example, a plate material using the driving device shown in FIGS. 4A and 4B;

FIGS. 9A and 9B are each a schematic sectional view showing a state in which a bolt is driven into the T-nut shown in FIG. 1A;

FIGS. 12A and 12B are each a schematic sectional view showing screwing of a bolt into the T-nut shown in FIG. 10A;

FIGS. 13A and 13C are, respectively, a vertical sectional view and a perspective view of a T-nut according to a third embodiment of the present invention;

FIGS. 13B and 13D are, respectively, a vertical sectional view and a perspective view of another T-nut;

FIGS. 14A to 14C are, respectively, a side view, a sectional view, and a perspective view of a sealing member of the T-nuts shown in FIGS. 13A to 13D;

FIGS. 16A to 16C are, respectively, a side view, a sectional view, and a perspective view of a sealing member of the T-nuts shown in FIGS. 15A and 15B;

FIG. 18A is a vertical sectional view of a T-nut according to a sixth embodiment of the present invention;

FIG. 18B is a vertical sectional view of another T-nut;

FIGS. 21A to 21F are plan views and side views of other flanges that may be used in the T-nut according to the present invention;

DESCRIPTION OF THE PREFERRED EMBODIMENTS

Embodiments of the present invention will hereunder be described in detail with reference to the drawings as appropriate. However, the invention of the subject application is not limited to the embodiments below.

First Embodiment

Figure 1:
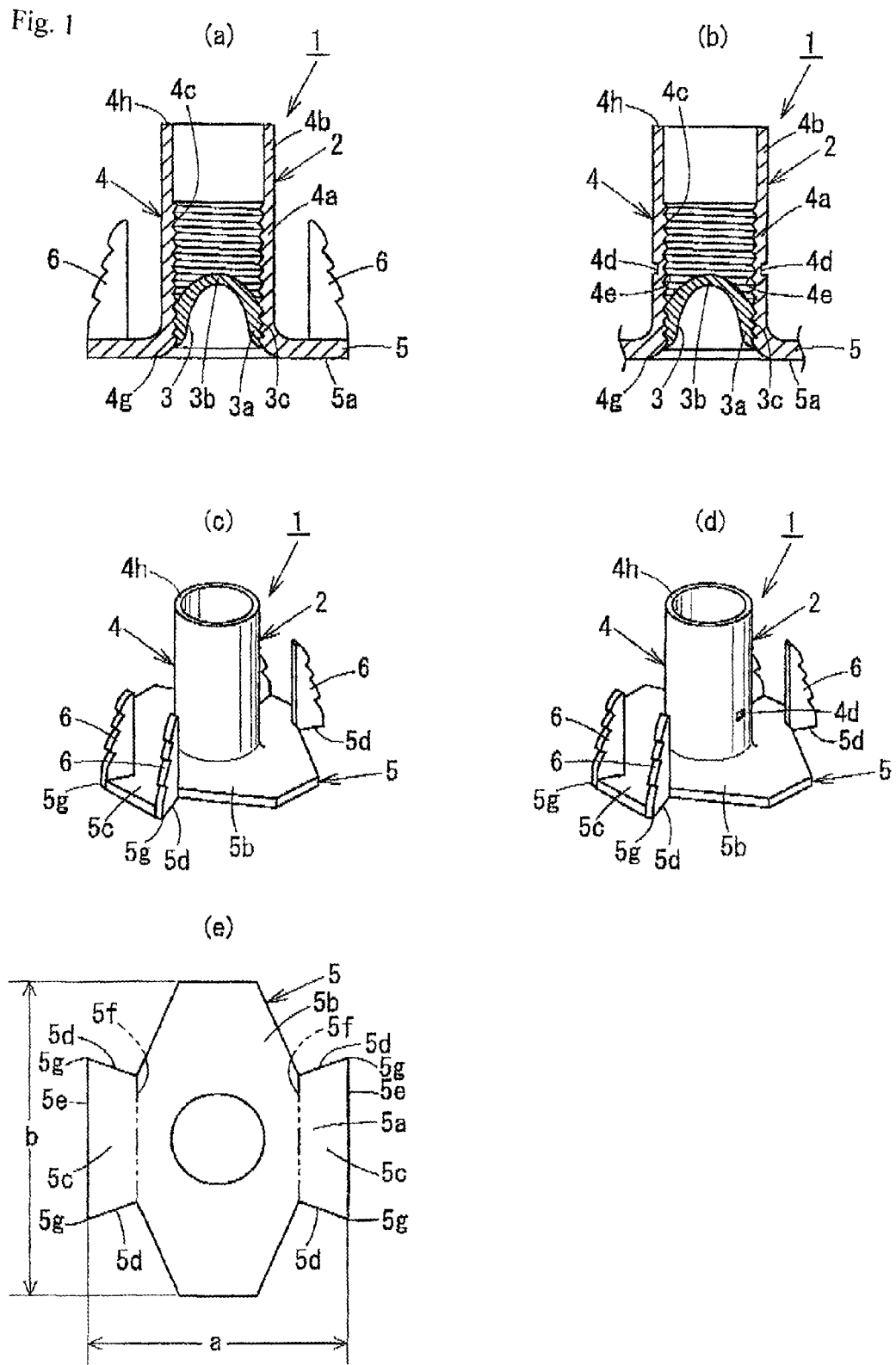
FIGS. 1A, 1C, and 1E are, respectively, a vertical sectional view, a perspective view, and a bottom view of a T-nut according to a first embodiment of the present invention.
FIGS. 1B and 1D are, respectively, a vertical sectional view and a perspective view of another T-nut.

FIGS. 1A, 1C, and 1E show a T-nut 1 according to a first embodiment of the present invention. As shown in these figures, the T-nut 1 includes a T-nut body 2 integrally formed using metal, and a sealing member 3 formed separately from the T-nut body 2.

By forging a metallic material or pressing a metallic plate, the T-nut body 2 is integrally formed. The T-nut body 2 includes a cylindrical shaft section 4 and a flange 5 extending outwardly from a first end portion of the shaft section 4.

The shaft section 4 is a hollow cylindrical section that is open at both ends thereof. The shaft section 4 includes an internally threaded portion 4a at a first-end-portion side (hereunder referred to as "upper side") and an intended-for-caulking portion 4b at a second-end-portion side (hereunder referred to as "lower side") opposite to the first-end-portion side. Internal threads 4c are formed in an inner peripheral surface of the internally threaded portion 4a. The intended-for-caulking portion 4b is formed so as to be thinner than the internally threaded portion 4a, and does not have internal threads in an inner peripheral surface thereof. In FIGS. 1A to 1D, reference numerals 4g and 4h denote an edge of the shaft section 4 at the first-end-portion side, and an edge of the shaft section 4 at the second-end-portion side, respectively.

An outer peripheral surface of the shaft section 4 is formed in the form of a step-less straight pipe except that its diameter gradually increases towards the first-end-portion side at a boundary between the outer peripheral surface of the shaft section 4 and a lower-side end surface of the flange 5. An inner peripheral surface of the shaft section 4 is provided so that its diameter gradually increases towards an upper end surface 5a at a boundary between the inner peripheral surface of the shaft section 4 and the upper end surface 5a of the flange 5. However, it is possible to form the end surface 5a and the inner peripheral surface of the shaft section 4 so as to intersect substantially perpendicularly without providing such a diameter increasing portion.

As shown in FIGS. 1B and 1D, a substantially rectangular recessed portion 4d may be provided by inwardly pressing and crushing a portion of an outer peripheral portion of the internally threaded portion 4a. By providing the recessed portion 4d, some of the internal threads in an inner peripheral surface of the recessed portion 4d protrude inward, as a result of which an irregular portion 4e is formed. This makes it possible to suppress loosening of a bolt by causing an external thread of the bolt to move onto the irregular portion 4e when the bolt is screwed into the shaft section 4.

As shown in FIGS. 1C and 1E, in bottom view, the flange 5 includes a substantially octagonal central portion 5b, and a pair of extending portions 5c and 5c that extend outwardly from a pair of end sides 5f and 5f opposing each other in a first radial direction of the shaft section 4 with the shaft section 4 at the central portion 5b being interposed therebetween. An overall width b of the flange 5 in a vertical direction is larger than an overall width a including the pair of extending portions 5c and 5c in a lateral direction.

Each extending portion 5c is surrounded by a pair of straight sides 5d and 5d (each straight side 5d extending outwardly from an end of the corresponding end side) and a line 5e (connecting outer end points 5g and 5g of the corresponding straight sides 5d and 5d). Each extending portion 5c is provided with a pair of claws 6 and 6 extending towards the second-end-portion side from the corresponding pair of straight sides 5d and 5d. The claws 6 are formed so that their outwardly facing end surfaces are zigzagged. Each of the extending portions 5c and 5c includes a pair of claws 6, so that there are two pairs of claws 6, or a total of four claws 6.

The claws 6 are formed by cutting and raising outer portions of the straight sides 5d and 5d in a metallic plate of which the T-nut body 2 is formed. The two pairs of, or four, claws 6 are symmetrically disposed in the first radial direction and a second radial direction that is orthogonal to the first radial direction with the shaft section 4 being disposed therebetween. The claws 6 are formed so that portions thereof in a widthwise direction extend somewhat radially outwardly from the side of the shaft section 4. However, as shown in FIG. 21F, as viewed from the second-end-portion side, the four claws 6 may be formed so that two rows of claws, each row including two claws, are provided with the widthwise direction being substantially parallel to the first radial direction.

Figure 2:
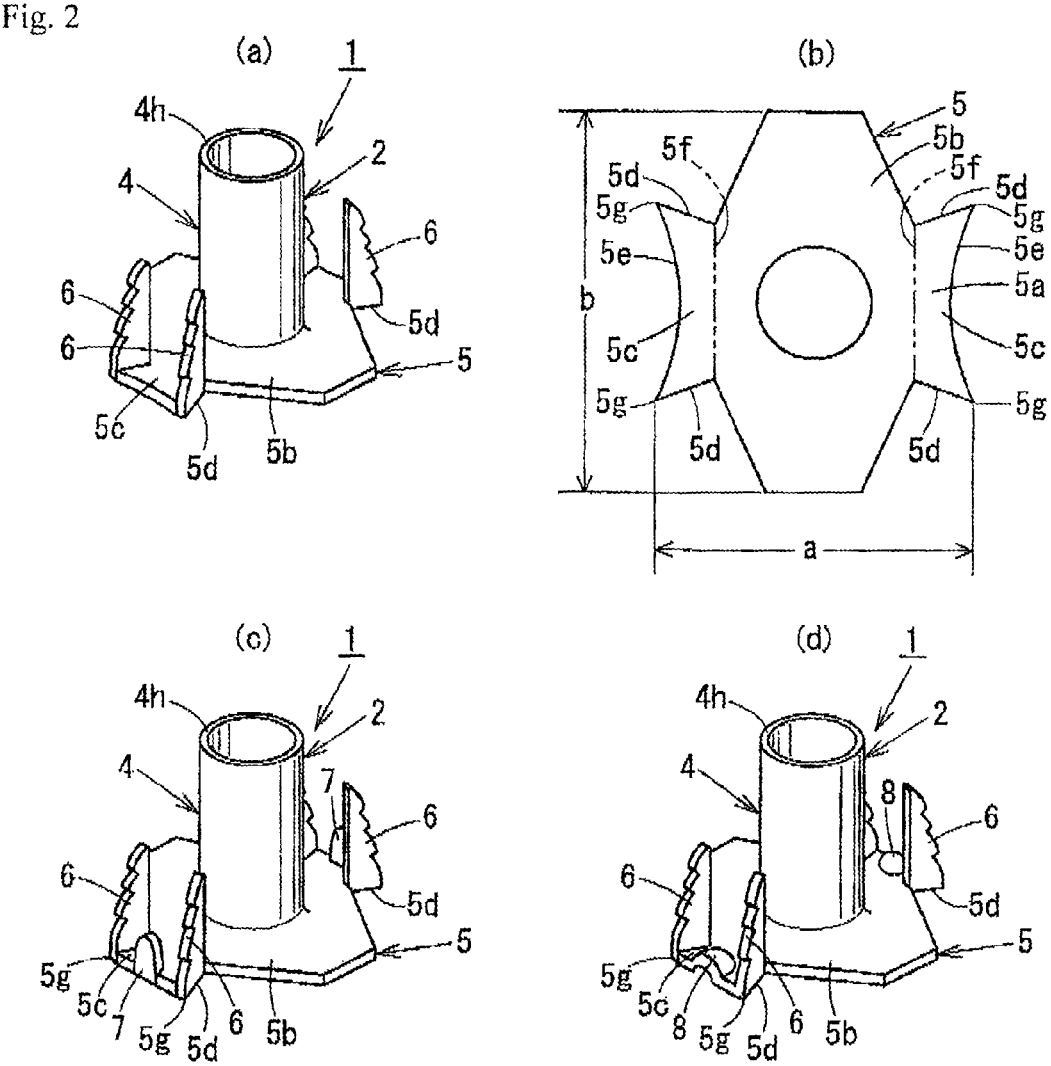
FIGS. 2A to 2D illustrate T-nuts according to the first embodiment of the present invention differing from the T-nuts shown in FIGS. 1A to 1D.
Figure 4:
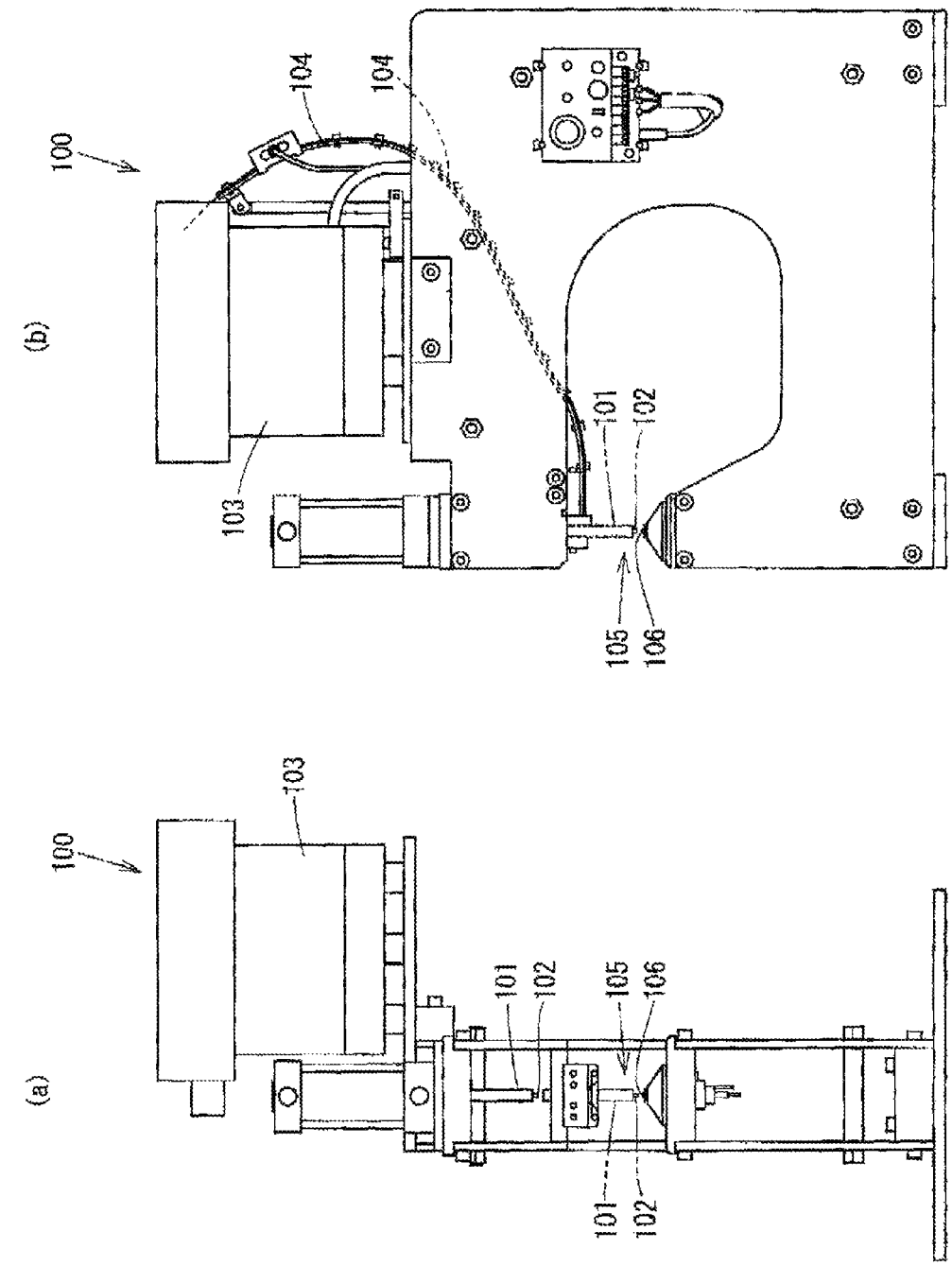
FIGS. 4A and 4B are, respectively, a front view and a side view of an exemplary driving device used for driving the T-nut according to the present invention into, for example, a plate material.

As shown in FIGS. 1C, 1E, and 1D, each line 5e connecting the end points 5g and 5g of the flange 5 may be a straight line. As shown in FIGS. 2A and 2B, each line 5e may be an inwardly curved line. As shown in FIG. 2C, a claw 7 may be provided between the claws 6 and 6 of each pair by cutting and raising upward an outer portion of the flange 5. Alternatively, as shown in FIG. 2D, a claw 8 may be provided between the claws 6 and 6 of each pair by pressing and deforming the flange 5 from an outer side thereof.

In this way, by forming the lines 5e into inwardly curved lines and providing the claw 7 or the claw 8 between the claws 6 and 6 of each pair, when the T-nut 1 is transported by the transport chute 104, it is possible to suppress superimposition of the flanges 5 of T-nut 1 that exist in front of and behind each other and that are transported.

The pair of end sides 5f and 5f are imaginary sides provided for the sake of explanation, and are not actually provided at the flange 5.

As shown in FIG. 1A and FIGS. 3A to 3C, the sealing member 3 has a circular cylindrical portion 3a and a dome-shaped cover 3b. The circular cylindrical portion 3a is open at the first-end-portion side. The dome-shaped cover 3b extends from an edge of the circular cylindrical portion 3a at the second-end-portion side. The top of the dome-shaped cover 3b faces the second-end-portion side. An outer peripheral surface of the circular cylindrical portion 3a is provided with an externally threaded long-and-narrow protruding portion 3c. The protruding portion 3c and the internal threads 4c are fitted to each other at ridges and roots, so that the spaces at the roots of the internal threads 4c are sealed. In this way, the inner peripheral surface of the shaft section 4 and the outer peripheral surface of the circular cylindrical portion 3a are in close contact with each other.

When the flange 5 at the first-end-portion side of the shaft section 4 is defined as the upper side, and the second-end-portion side is defined as the lower side, the sealing member 3 is such that its upper edge is positioned in the same plane as the upper end surface 5a of the flange 5 or is positioned below the end surface 5a. The upper edge of the sealing member 3 becomes thinner while its diameter gradually increases towards the end surface 5a so as to follow the inner peripheral surface of a boundary between the shaft section 4 and the end surface 5a. The outer peripheral surface of the upper edge of the sealing member 3 is provided so as to be close contact with an inner wall of the shaft section up to its end.

Figure 24:
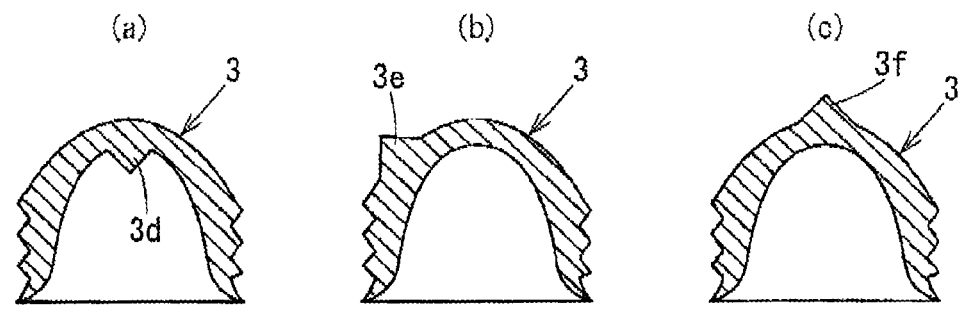
FIGS. 24A to 24C are modifications of the sealing member shown in FIGS. 3A to 3C.

As shown in FIG. 24A, it is desirable that an inner peripheral surface of the cover 3b have a protrusion 3d. This makes it possible to correct positional displacement of the sealing member by putting one's finger on the protrusion 3d when the positional displacement of the sealing member 3a occurs.

As shown in FIGS. 24B and 24C, it is desirable that an outer surface of the cover 3b have a protrusion 3e or a protrusion 3f. By bringing the protrusion 3e or 3f into contact with an end surface of a bolt A, it is possible to suppress loosening of the bolt A. As shown in FIG. 24B, by providing the protrusion 3e at an outer peripheral portion of the cover 3b, when the bolt A is screwed into the T-nut 1, it is possible to mesh the protrusion 3e between the internal threads 4c and the bolt A, so that the loosening of the bolt A can be suppressed.

Even in second to eighth embodiments described below, it is possible to similarly provide any one of the protrusions 3d, 3e, and 3f on the cover.

Although not particularly limited, rubber or thermoplastic elastomer may be used as the elastomeric resin forming the sealing member 3. The rubber may be, for example, natural rubber, polyisoprene, polybutadiene, styrene-butadiene copolymer, acrylonitrile-butadiene copolymer, ethylene-propylene-dien copolymer, ethylene-propylene copolymer, polychloroprene, isobutylene-isoprene copolymer, or silicone rubber. The thermoplastic elastomer may be, for example, styrene block copolymer, thermoplastic elastomer olefin, ester theromoplastic elastomer, thermoplastic elastomer urethane, thermoplastic elastomer amide, thermoplastic elastomer fluorine, or a mixture thereof.

For elastomeric resin forming sealing members in the second to eighth embodiments described below, any of the elastomeric resins used to form the sealing member 3 in the first embodiment may be suitably used.

Next, the method of use of the T-nut 1 will be described with reference to FIGS. 4A to 9B.

FIGS. 4A and 4B shows a driving device 100 used for driving the T-nut 1 according to the present invention into, for example, a plate material. The T-nut 1 is aligned at an aligning/supplying section 103, and is transported to a T-nut driving-in section 105 by the transport chute 104.

Figure 5:
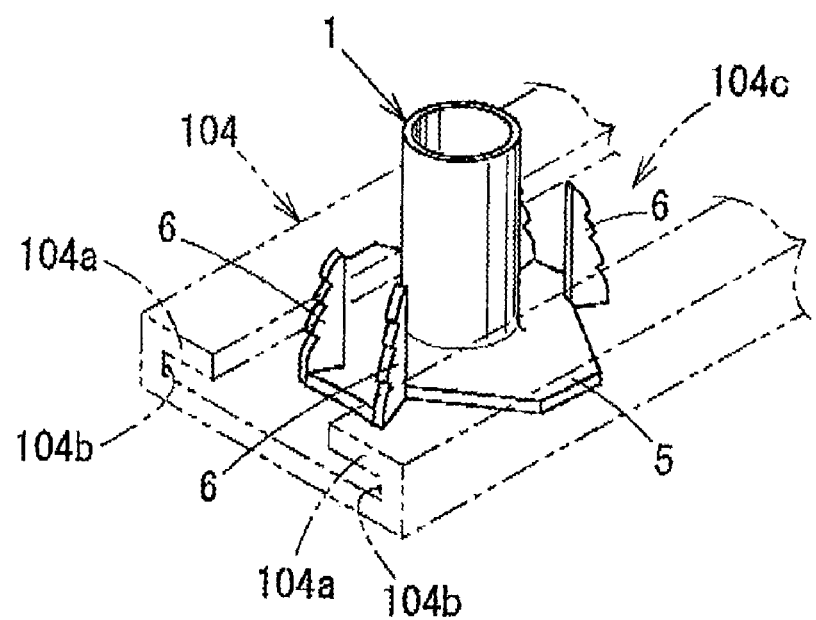
FIG. 5 illustrates a T-nut that is being transported by a transport chute of the driving device shown in FIGS. 4A and 4B.

As shown in FIG. 5, the transport chute 104 is provided with side walls at respective ends of a strip-like member in a widthwise direction. The transport chute 104 includes a pair of flanges 104a and 104a, each flange 104a extending inwardly from a corresponding side wall, so that a pair of rectangular grooves 104b and 104b and a strip-like opening 104c are provided. The rectangular grooves 104b and 104b are provided at inner sides of the respective side walls. The strip-like opening 104c is formed continuously at both ends of the transport chute 104 in a longitudinal direction thereof.

The T-nut 1 is transported while end portions of the flange 5 in a vertical direction are inserted into the rectangular grooves 104b and 104b of the transport chute 104, and while the four pawls 6 project from the opening 104c. The four pawls 6 of the T-nut 1 are formed so as to be guides formed in accordance with the strip-like opening 104c. The T-nut 1 is provided so that the first-end-portion-side edge of the sealing member 3 is positioned in the same plane as or below the upper end surface 5a of the flange 5, that is, so that the first-end-portion-side edge of the sealing member 3 does not project above the end surface 5a. Therefore, the sealing member 5 almost never contacts an inner wall of the transport chute 104, so that the sealing member 3 does not interfere with the transportation of the T-nut 1. By forming the four claws 6 as guides that are formed in accordance with the strip-like opening 104c, it is possible to form the flange 5 with different shapes.

It goes without saying that the T-nut according to the present invention may also refer to a T-nut that cannot be transported by the transport chute 104 shown in FIG. 5.

FIGS. 6A and 6B show driving of the T-nut 1 into a plate material B using the driving device 100. FIG. 6A shows a state prior to driving the T-nut 1 into the plate material B, whereas FIG. 6B shows a state after driving the T-nut 1 into the plate material B. As shown in FIG. 6B, the flange 5 is pressed by a push bar 101, and the T-nut 101 is driven into a lower hole in the plate material B. At this time, a guide pin 102, provided at an end of the push bar 101, is inserted into the shaft section 4 of the T-nut 1 to prevent lateral displacement of the T-nut 1.

At this time, the guide pin 102 is accommodated in a space in the sealing member 3 from a first-end-portion-side opening of the sealing member 3. Even if an end of the guide pin 102 strikes the inner surface of the sealing member 3 because the guide pin 102 is long, since the sealing member 3 is formed of elastomeric resin, it is possible to widen an internal space by extending it in an axial direction, and accommodate the guide pin 102 in the internal space, as shown in FIG. 6B.

Figure 7:
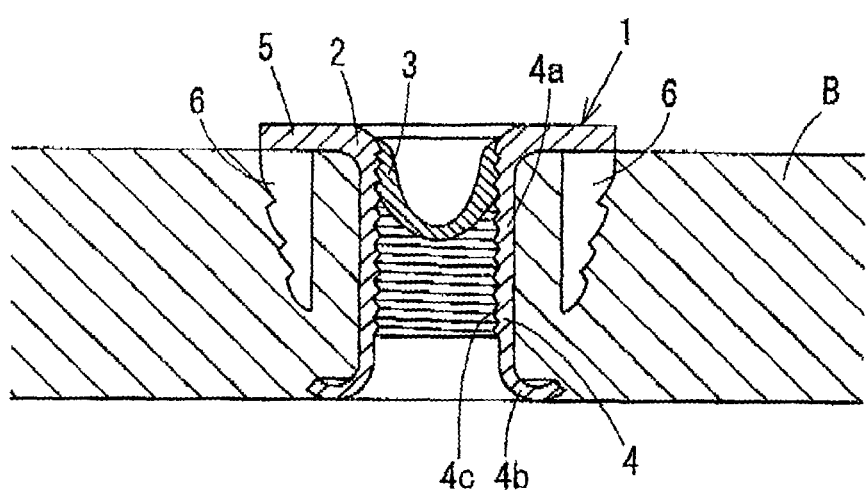
FIG. 7 is a schematic sectional view showing a state in which the T-nut shown in FIG. 1A is secured to a plate material.

At the same time that the T-nut 1 is driven into the plate material B, as shown in FIG. 6B, the intended-for-caulking portion 4b is pressed and widened in an outward direction by a guide chip 106 disposed at the lower side of the plate material B, and is driven into a lower-end peripheral edge of a lower hole of the plate material B. As shown in FIG. 7, the caulked portion and the flange 5 cause the T-nut 1 to sandwich the plate material B, and to be secured to the plate material B.

Figure 8:
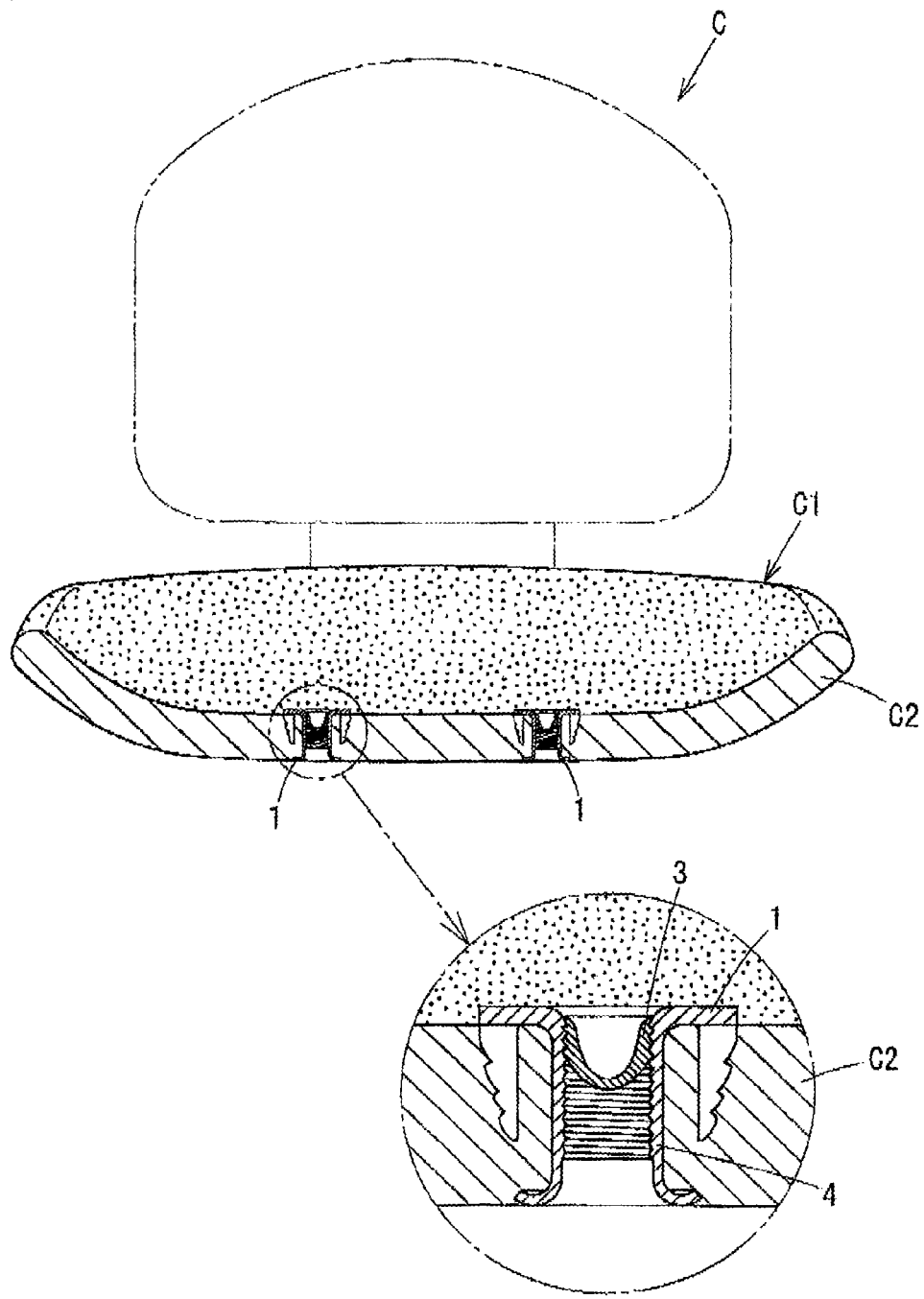
FIG. 8 is a schematic sectional view showing a state in which T-nuts such as that shown in FIG. 1A are mounted to an office chair.
Figure 10:
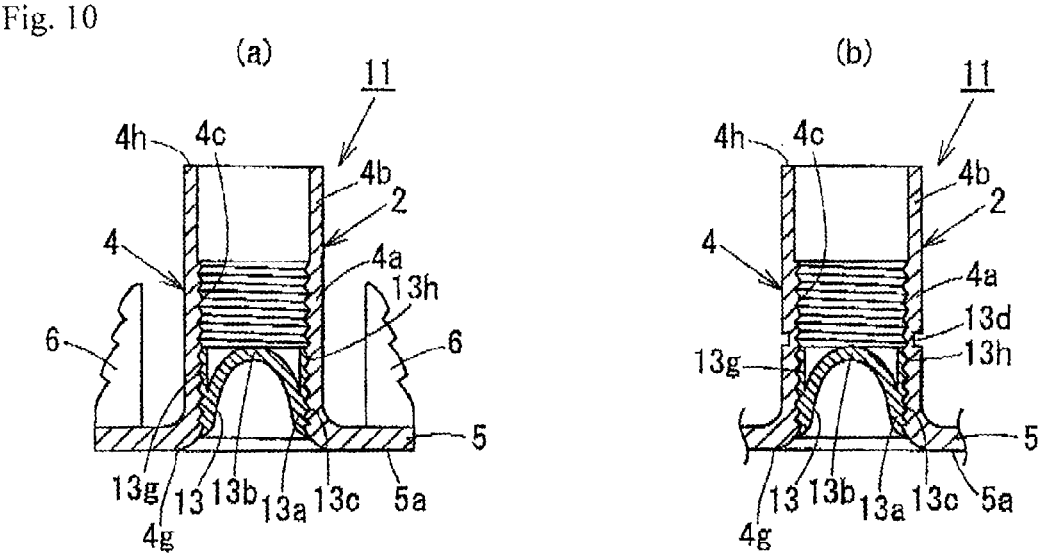
FIG. 10A is a vertical sectional view of a T-nut according to a second embodiment of the present invention.
FIG. 10B is a vertical sectional view of another T-nut.
Figure 11:
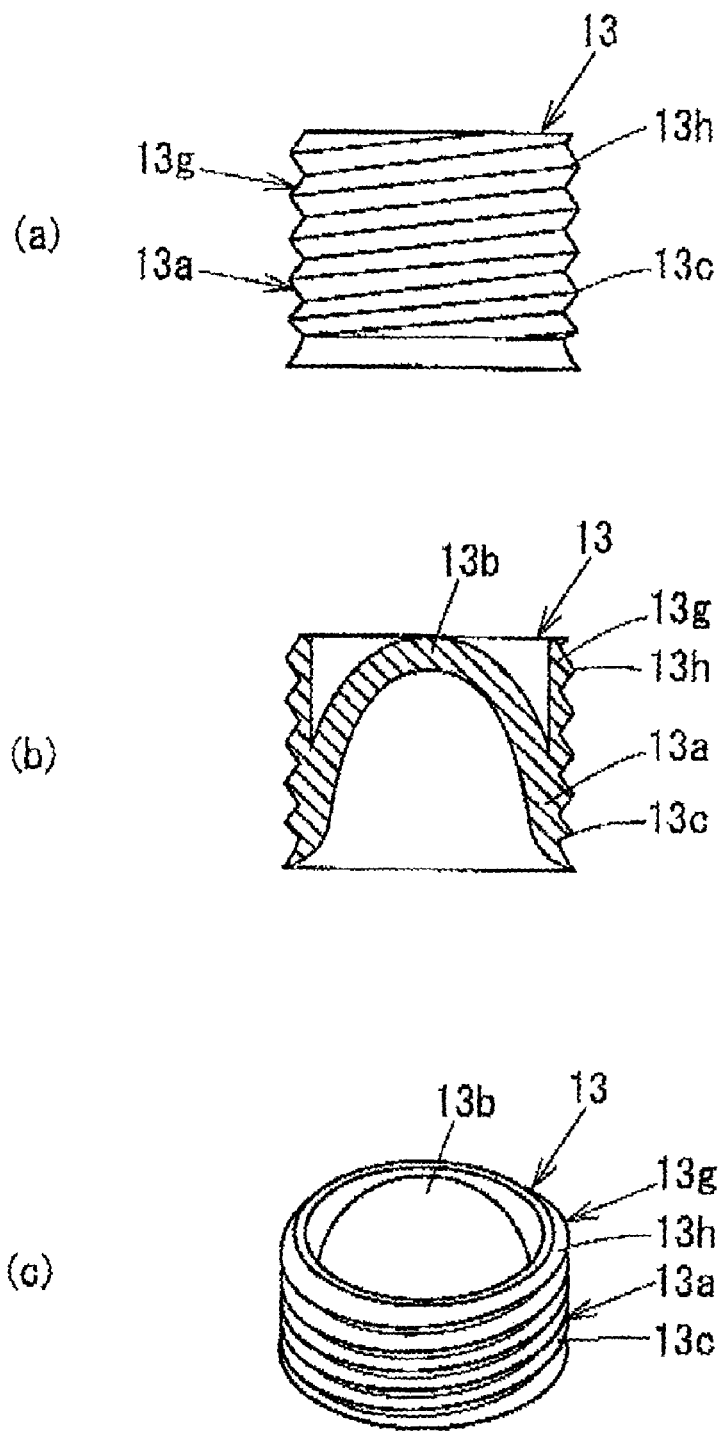
FIGS. 11A to 11C are, respectively, a side view, a sectional view, and a perspective view of a sealing member of the T-nuts shown in FIGS. 10A and 10B.
Figure 15:
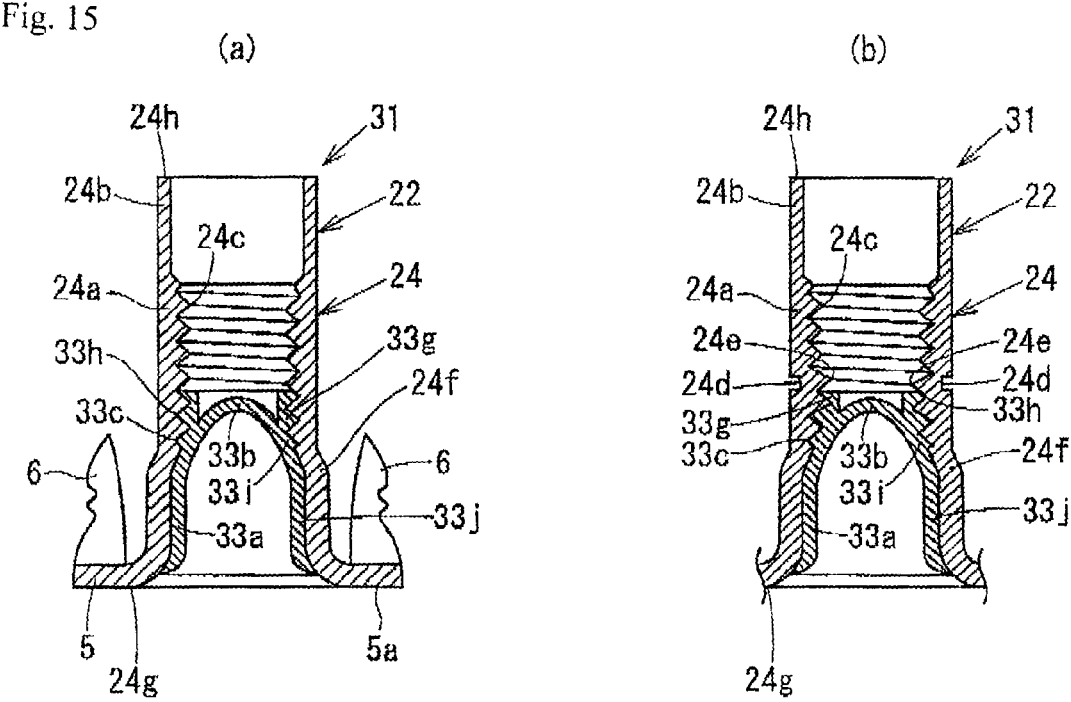
FIG. 15A is a vertical sectional view of a T-nut according to a fourth embodiment of the present invention.
FIG. 15B is a vertical sectional view of another T-nut.

FIG. 8 shows a state in which T-nuts 1 are driven into a seat frame C2 of a sitting portion C1 of an office chair C from above the seat frame C2. Resin foam, such as synthetic resin foam, urethane rubber foam, or polyethylene foam, in a molten state is caused to flow into the upper side of the seat frame C2, as a result of which the upper side of the seat frame C2 is formed of foam.

Since the sealing member 3 of the T-nut 1 provides sufficient sealability, it is possible to prevent the molten resin from flowing into the shaft section 4.

FIGS. 9A and 9B each show a state in which the bolt A is screwed into the T-nut 1. FIG. 9A shows a case in which the bolt A is screwed into the shaft section 4 by an amount that allows an end of the bolt A to slightly press and deform an end of the cover 3b. When the deformed cover 3b pushes back the end of the bolt 4 by resilient force, friction force is generated between the cover 3b and the end of the bolt, thereby suppressing loosening of the bolt A. FIG. 9B shows a case in which a peripheral edge at the end of the bolt A is moved into the shaft section 4 until the peripheral edge contacts a peripheral edge of the sealing member. When the end of the bolt A is moved sufficiently deeply into the shaft section 4, an area of contact of the cover 3b and the end of the bolt A is increased, and the outer peripheral portion of the sealing member 3 is meshed between the end of the bolt A and the inner peripheral surface of the shaft section 4, so that the loosening of the bolt A is more effectively suppressed.

As shown in FIGS. 9A and 9B, even if the sealing member 3 is pushed by the bolt A, since the sealing member 3 is resiliently deformable, and the protruding portion 3c is firmly stopped by the female threads 4c, positional displacement and falling off of the sealing member 3 do not easily occur.

Second Embodiment

Next, a second embodiment of the present invention will be described in detail with reference to FIGS. 10A to 12B. A T-nut body according to the second embodiment is similar to that according to the first embodiment. Therefore, the T-nut body and each portion thereof will be given the same reference numerals as those in the first embodiment, and will not be described.

As shown in FIGS. 10A to 11C, a sealing member 13 of a T-nut 11 according to the second embodiment has a circular cylindrical portion 13a, a dome-shaped cover 13b, and an outer cylindrical portion 13g. The circular cylindrical portion 13a is open at a first-end-portion side. The dome-shaped cover 3b extends from an edge of the circular cylindrical portion 13a at a second-end-portion side. The top of the dome-shaped cover 13b faces the second-end-portion side. The outer cylindrical portion 13g similarly extends to an outer side of the cover 13b from the second-end-portion-side edge of the circular cylindrical portion 13a, and surrounds the outer periphery of the cover 13b.

An outer peripheral surface of the outer cylindrical portion 13g is provided with an externally threaded long-and-narrow protruding portion 13h that is formed continuously to an externally threaded long-and-narrow protruding portion 13c of the circular cylindrical portion 13a. The protruding portions 13c and 13h are fitted to internal threads 4c at their ridges and valleys, so that the spaces at the roots of the internal threads are sealed. By this, the inner peripheral surface of a shaft section 4 is in close contact with the outer peripheral surface of the circular cylindrical portion 13a and the outer peripheral surface of the outer cylindrical portion 13g. However, the protruding portion 13c at the outer peripheral surface of the circular cylindrical portion 13a and the protruding portion 13h at the outer peripheral surface of the outer cylindrical portion 13g need not be continuously formed.

The other structural features of the circular cylindrical portion 13a are roughly the same as those of the sealing member 3a according to the first embodiment, so that they will not be described.

FIGS. 12A and 12B each show a state in which a bolt A is screwed into the shaft section 4 from a second-end-portion-side opening of the T-nut 11. FIG. 12A shows a case in which the bolt A is screwed into the shaft section 4 by an amount that allows an end of the bolt A to slightly press and deform an end of the cover 13b. The outer cylindrical portion 13g is formed so that it can be meshed between the bolt A and the associated internal threads 4c. When the bolt A is screwed into the shaft section 4 by this amount, an end of the outer cylindrical portion 13g is slightly meshed between the end of the bolt and the associated internal threads 4a. In addition to friction force generated when the end of the cover 13b pushes back the end of the bolt A, meshing of the end of the outer cylindrical portion 13g between the bolt A and the associated internal threads 4c effectively suppresses the loosening of the bolt A.

FIG. 12B shows a case in which the bolt A is more deeply screwed into the shaft section 4 from the state shown in FIG. 12A. When the end of the bolt A is more deeply screwed into the shaft section 4, the end of the cover 13b is crushed, and is deformed inside out, so that the outer cylindrical portion 13g is also crushed deeply between the end of the bolt A and the inner peripheral surface of the shaft section 4. This more effectively suppresses loosening of the bolt A.

Even if the bolt A presses the sealing member 13, since the sealing member 13 is resiliently deformable, positional displacement and falling off of the sealing member 13 do not easily occur.

Third Embodiment

Next, a third embodiment of the present invention will be described in detail with reference to FIGS. 13A to 14C.

A T-nut 21 according to the third embodiment is what is called a step barrel T-nut. As shown in FIGS. 13A and 13B, the T-nut 21 includes a T-nut body 22 integrally formed using metal, and a sealing member 23 formed separately from the T-nut body 22.

As in the first and second embodiments, by forging a metallic material or pressing a metallic plate, the T-nut body 22 is integrally formed. The T-nut body 2 includes a cylindrical shaft section 24 and a flange 5 extending outwardly from a first end portion of the shaft section 24. Although the shapes of claws of the flange 5 are slightly different from those in the first and second embodiments, the claws generally have the same structures as those in the first and second embodiments. Therefore, each portion will be given the same reference numeral, and will not be described below.

The shaft section 24 is a hollow cylindrical section that is open at both ends thereof. The shaft section 4 includes a diameter increasing portion 24f at a first-end-portion side, an internally threaded portion 24a at the first-end-portion side, and an intended-for-caulking portion 24b at a second-end-portion side. Internal threads 24c are formed in an inner peripheral surface of the internally threaded portion 24a. The intended-for-caulking portion 24b is formed so as to be thinner than the internally threaded portion 24a and the diameter increasing portion 24f. Internal threads are not formed in an inner peripheral surface of the diameter increasing portion 24f and an inner peripheral surface of the intended-for-caulking portion 24b. The outside diameter and the inside diameter of the shaft section 24 gradually increase towards the first-end-portion side at a boundary between the internally threaded portion 24a and the diameter increasing portion 24f. The diameter increasing portion 24f is formed so that its inside diameter and outside diameter are larger than those of the internally threaded portion 24a.

Even in the third embodiment, as shown in FIGS. 13B and 13D, by forming a recessed portion 24d by inwardly pressing and crushing a portion of an outer peripheral portion of the internally threaded portion 24a, it is possible to form an irregular portion 24e in an inner peripheral surface of the internally threaded portion 24a.

Reference numerals 24g and 24h denote a first-end-portion-side edge and a second-end-portion-side edge of the shaft section 24, respectively.

As shown in FIGS. 13A to 14C, the sealing member 23 has a circular cylindrical portion 23a and a dome-shaped cover 23b. The circular cylindrical portion 23a is open at the first-end-portion side. The dome-shaped cover 23b extends from an edge of the circular cylindrical portion 23a at the second-end-portion side. The top of the dome-shaped cover 23b faces the second-end-portion side. The circular cylindrical portion 23a includes an internally threaded closely contacting portion 23i and a diameter increasing portion 23j. The closely contacting portion 23i closely contacts the associated internal threads 24c at the second-end-portion side. The diameter increasing portion 23j increases in diameter along an inner peripheral surface of the diameter increasing portion 24f at the first-end-portion side. An outer peripheral surface of the internally threaded closely contacting portion 23i includes an externally threaded long-and-narrow protruding portion 23c. The protruding portion 23c and the internal threads 24c are fitted to each other at ridges and valleys, so that the spaces at the roots of the internal threads 24c are sealed. In this way, the inner peripheral surface of the shaft section 4 and the outer peripheral surface of the internally threaded closely contacting portion 23i are in close contact with each other.

When the flange 5 is at the upper side, the sealing member 23 is fitted to a first-end-portion-side opening of the shaft section 24 so that its upper edge is positioned in the same plane as an upper end surface 5a of the flange 5 or is positioned below the end surface 5a. The upper edge of the sealing member 23 becomes thinner while its diameter gradually increases towards the upper edge so as to follow the inner peripheral surface of a boundary between the shaft section 24 and the upper end surface 5a of the flange 5. The outer peripheral surface of the sealing member 23 is provided so as to be in close contact with an inner wall of the shaft section up to its end.

Fourth Embodiment

A fourth embodiment of the present invention will be described in detail with reference to FIGS. 15A to 16C. A T-nut body according to the fourth embodiment is similar to that according to the third embodiment. Therefore, the T-nut body and each portion thereof will be given the same reference numerals as those in the third embodiment, and will not be described.

As shown in FIGS. 15A to 16C, a sealing member 33 of the T-nut 13 according to the fourth embodiment has a circular cylindrical portion 33a, a dome-shaped cover 33b, and an outer cylindrical portion 33g. The circular cylindrical portion 33a is open at a first-end-portion side. The dome-shaped cover 33b extends from an edge of the circular cylindrical portion 33a at a second-end-portion side. The top of the dome-shaped cover 33b faces the second-end-portion side. The outer cylindrical portion 33g similarly extends to an outer side of the cover 33b from the second-end-portion-side edge of the circular cylindrical portion 33a, and surrounds the outer periphery of the cover 33b.

An outer peripheral surface of the outer cylindrical portion 33g is provided with an externally threaded long-and-narrow protruding portion 33h that is formed continuously to an externally threaded long-and-narrow protruding portion 33c of the circular cylindrical portion 33a. The protruding portions 33c and 33h are fitted to internal threads 24c at their ridges and valleys, so that the spaces at the roots of the internal threads are sealed. By this, the inner peripheral surface of a shaft section 4 is in close contact with the outer peripheral surface of the circular cylindrical portion 33a and the outer peripheral surface of the outer cylindrical portion 33g. However, the protruding portion 33c at the outer peripheral surface of the circular cylindrical portion 33a and the protruding portion 33h at the outer peripheral surface of the outer cylindrical portion 33g need not be continuously formed.

The other structural features of the circular cylindrical portion 33a are roughly the same as those of the circular cylindrical portion 23a according to the third embodiment, so that they will not be described.

Fifth Embodiment

A fifth embodiment of the present invention will be described in detail with reference to FIGS. 17A to 17D. A sealing member according to the fifth embodiment is similar to that according to the third embodiment. Therefore, the sealing member will be given the same reference numeral as that in the third embodiment, and will not be described.

A T-nut 41 according to the fifth embodiment is what is called a step barrel T-nut as in the fourth embodiment. As shown in FIGS. 17A to 17D, the T-nut 21 includes a T-nut body 42 integrally formed using metal, and the sealing member 23 formed separately from the T-nut body 42.

As in each of the previous embodiments, by forging a metallic material or pressing a metallic plate, the T-nut body 42 is integrally formed. The T-nut body 42 includes a cylindrical shaft section 44 and a flange 5 extending outwardly from a first end portion of the shaft section 44. The structure of the flange 5 according to the fifth embodiment is generally the same as that in each of the previous embodiments. Therefore, each portion will be given the same reference numeral, and will not be described below.

The shaft section 44 is a hollow cylindrical section that is open at both ends thereof. The shaft section 44 includes a diameter increasing portion 44f at a first-end-portion side, and an internally threaded portion 44a at a second-end-portion side. Unlike in each of the previous embodiments, an intended-for-caulking portion is not provided. Corners of second-end-portion inner peripheral edges of the internally threaded portion 44a are chamfered and tapered. Internal threads 44c are formed in an inner peripheral surface of the internally threaded portion 44a. The diameter increasing portion 44f is formed so that its inside diameter and outside diameter are larger than those of the internally threaded portion 44a. The outside diameter and the inside diameter of the shaft section 44 gradually increase towards the first-end-portion side at a boundary between the internally threaded portion 44a and the diameter increasing portion 44f.

Figure 17:
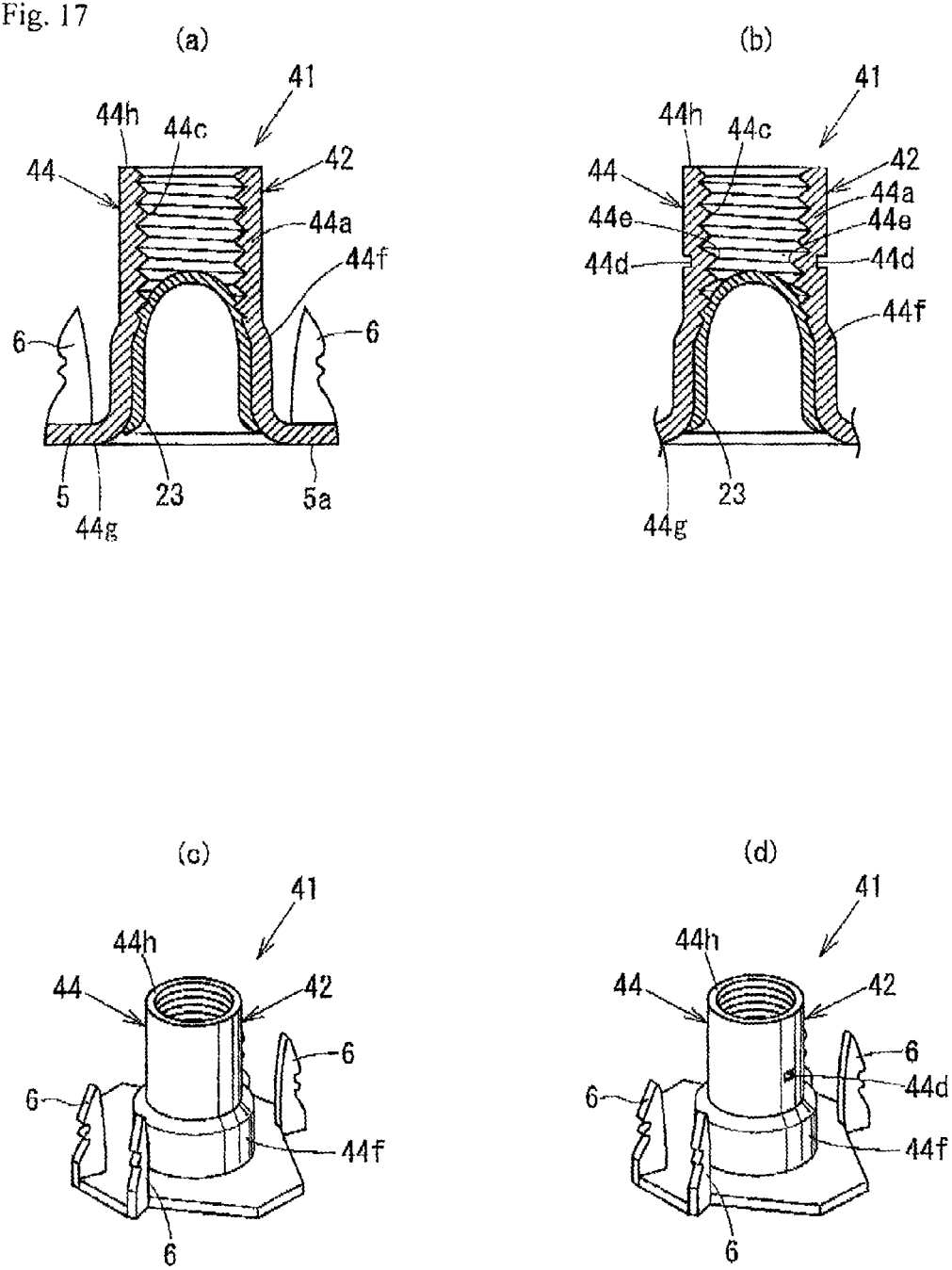
FIGS. 17A and 17C are, respectively, a vertical sectional view and a perspective view of a T-nut according to a fifth embodiment of the present invention.
FIGS. 17B and 17D are, respectively, a vertical sectional view and a perspective view of another T-nut.

Even in the fifth embodiment, as shown in FIGS. 17B and 17D, by forming a recessed portion 44d by inwardly pressing and crushing a portion of an outer peripheral portion of the internally threaded portion 44a, it is possible to form an irregular portion 44e in the inner peripheral surface of the internally threaded portion 44a.

Reference numerals 44g and 44h in the figures denote a first-end-portion-side edge and a second-end-portion-side edge of the shaft section 44, respectively.

Sixth Embodiment

FIGS. 18A and 18B show a T-nut 51 according to a sixth embodiment of the present invention. In the T-nut 51 according to the sixth embodiment, a T-nut body is similar to that according to the fifth embodiment, and a sealing member is similar to that according to the third embodiment.

Seventh Embodiment

A seventh embodiment of the present invention will be described in detail with reference to FIGS. 19A to 19D. A sealing member according to the seventh embodiment is similar to that according to the first embodiment. Therefore, the sealing member is given the same reference numeral as that in the first embodiment, and will not be described.

As shown in FIGS. 19A to 19D, a T-nut 61 according to the seventh embodiment includes a T-nut body 62 integrally formed using metal, and the sealing member 3 formed separately from the T-nut body 62.

As in the previous embodiments, by forging a metallic material or pressing a metallic plate, the T-nut body 62 is integrally formed. The T-nut body 62 includes a cylindrical shaft section 64 and a flange 5 extending outwardly from a first end portion of the shaft section 64. The structure of the sealing member 3 according to the seventh embodiment is generally the same as that according to the first embodiment, and the structure of the flange 5 is generally the same as that according to each of the previous embodiments. Therefore, each portion thereof will be given the same reference numeral, and will not be described below.

The shaft section 64 is a hollow cylindrical section that is open at both ends thereof. The shaft section 64 is formed in the form of a straight pipe in its entire length except that the diameters of the outer peripheral surface and the inner peripheral surface of the shaft section 64 increase gradually at a boundary between the flange 5 and the outer peripheral surface and the inner peripheral surface of the shaft section 4. The inner peripheral surface of the shaft section 64 is provided with internal threads 64c in its entire length except at a portion whose diameter gradually increases towards an end surface 5a of the flange 5a. That is, the shaft section 64 is not provided with an intended-for-caulking portion.

A diameter increasing portion need not be provided at the boundary between the flange 5 and the inner peripheral surface of the shaft section 64. The internal threads may obviously be provided along the entire length of the inner peripheral surface of the shaft section.

Figure 19:
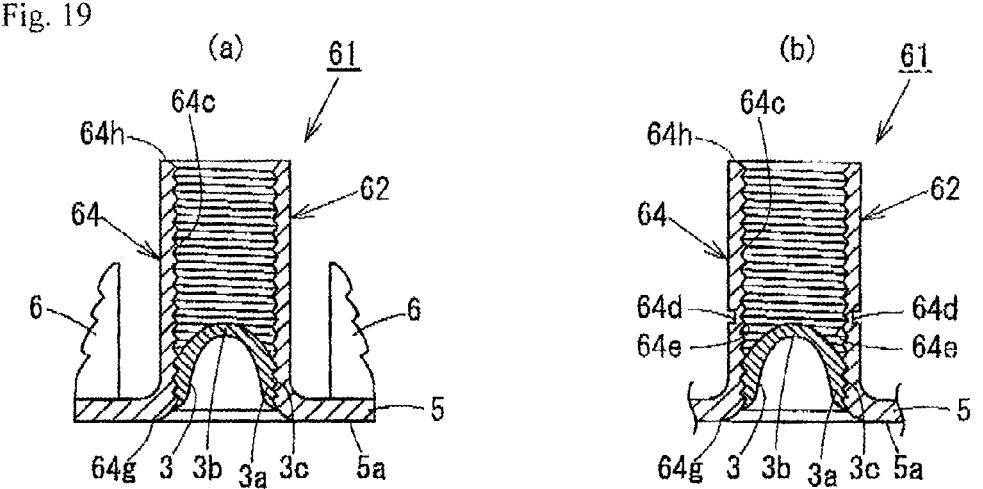
FIGS. 19A and 19C are, respectively, a vertical sectional view and a perspective view of a T-nut according to a seventh embodiment of the present invention.
FIGS. 19B and 19D are, respectively, a vertical sectional view and a perspective view of another T-nut.

Even in the seventh embodiment, as shown in FIGS. 19B and 19D, by forming a recessed portion 64d by inwardly pressing and crushing a portion of an outer peripheral portion of the shaft section 64, it is possible to form an irregular portion 64e in the inner peripheral surface of the shaft section 64.

Reference numerals 64g and 64h denote a first-end-portion-side edge and a second-end-portion-side edge of the shaft section 64, respectively.

Eighth Embodiment

Figure 20:
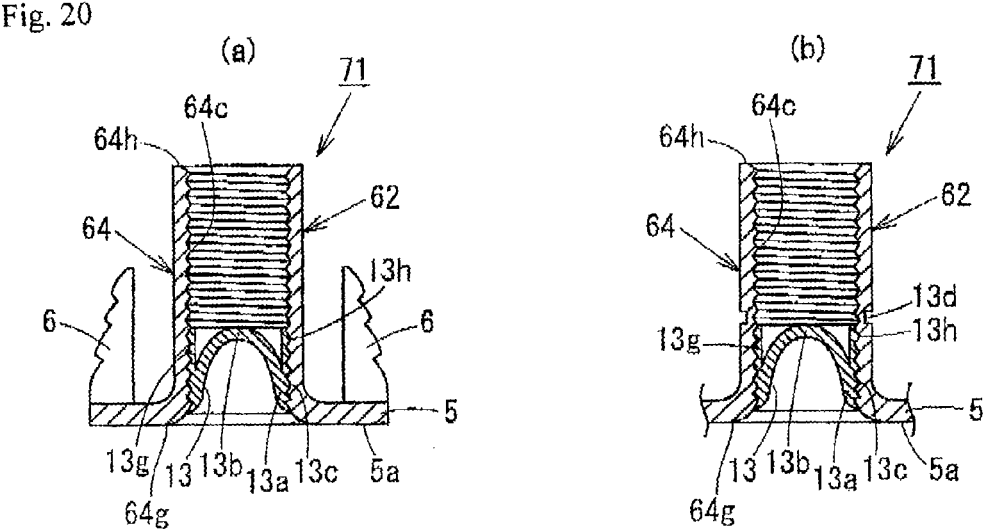
FIG. 20A is a vertical sectional view of a T-nut according to an eighth embodiment of the present invention.
FIG. 20B is a vertical sectional view of another T-nut.

FIGS. 20A and 20B show a T-nut 71 according to an eighth embodiment of the present invention. In the T-nut 71 according to the eighth embodiment, a T-nut body 62 is similar to that according to the seventh embodiment, and a sealing member 3 is similar to that according to the second embodiment.

From the first embodiment to the eighth embodiment, the shapes of the flange 5 and the claws 6 are not limited to those described above. They may be formed with various other shapes that are publicly known or that are modifications of the shapes described above. In addition to being capable of being formed with any of the various shapes shown in FIGS. 21A to 21F, the flange may be formed with a shape in which, as viewed from the first-end-portion side, at least a portion of an outer peripheral edge is formed by a straight line; the outer peripheral edge is formed by a straight line and a curved line; the outer peripheral edge is only formed by straight lines (square-shape, a rectangular shape, or any other polygonal shapes); or the outer peripheral edge is only formed with a curved line (such as a circular shape or an elliptical shape). As shown in FIGS. 21A, 21B, and 21C, the claws 6 may be formed at substantially equal intervals along the outer periphery of the flange 5. The shape of each pawl 6 may be selected as appropriate from, for example, a curved shape in which the outer edge is not zigzagged or does not have a hook (such as that shown in FIG. 25A); a shape in which the outer edge is zigzagged (such as that shown in FIG. 25B); and a shape in which the outer edge has a hook shape (such as that shown in FIG. 25C). As shown in FIG. 21E, instead of providing pawls 6, a plurality of long and narrow protrusions may be provided by pressing a portion of the flange. One pawl 6 or one protrusion may be formed. Instead of providing pawls 6 or protrusions, it is possible to provide the shaft section with a portion whose outer periphery has a rectangular cylindrical shape, with the portion serving as a rotational stoppage portion.

Although, in the side views shown in FIGS. 21A to 21F, the shaft section does not include a diameter increasing portion, it is obvious that, in the third to sixth embodiments, the shaft section may be replaced by one including a diameter increasing portion.

Ninth Embodiment

Next, a ninth embodiment of the present invention will be described in detail with reference to FIGS. 22A to 22D.

A T-nut 81 according to the ninth embodiment includes a T-nut body 2 and a sealing member 83. The T-nut body 2 is similar to the T-nut body 2 according to each of the first and second embodiments. Therefore, the T-nut body 2 has the same reference numeral and will not be described below.

Figure 22:
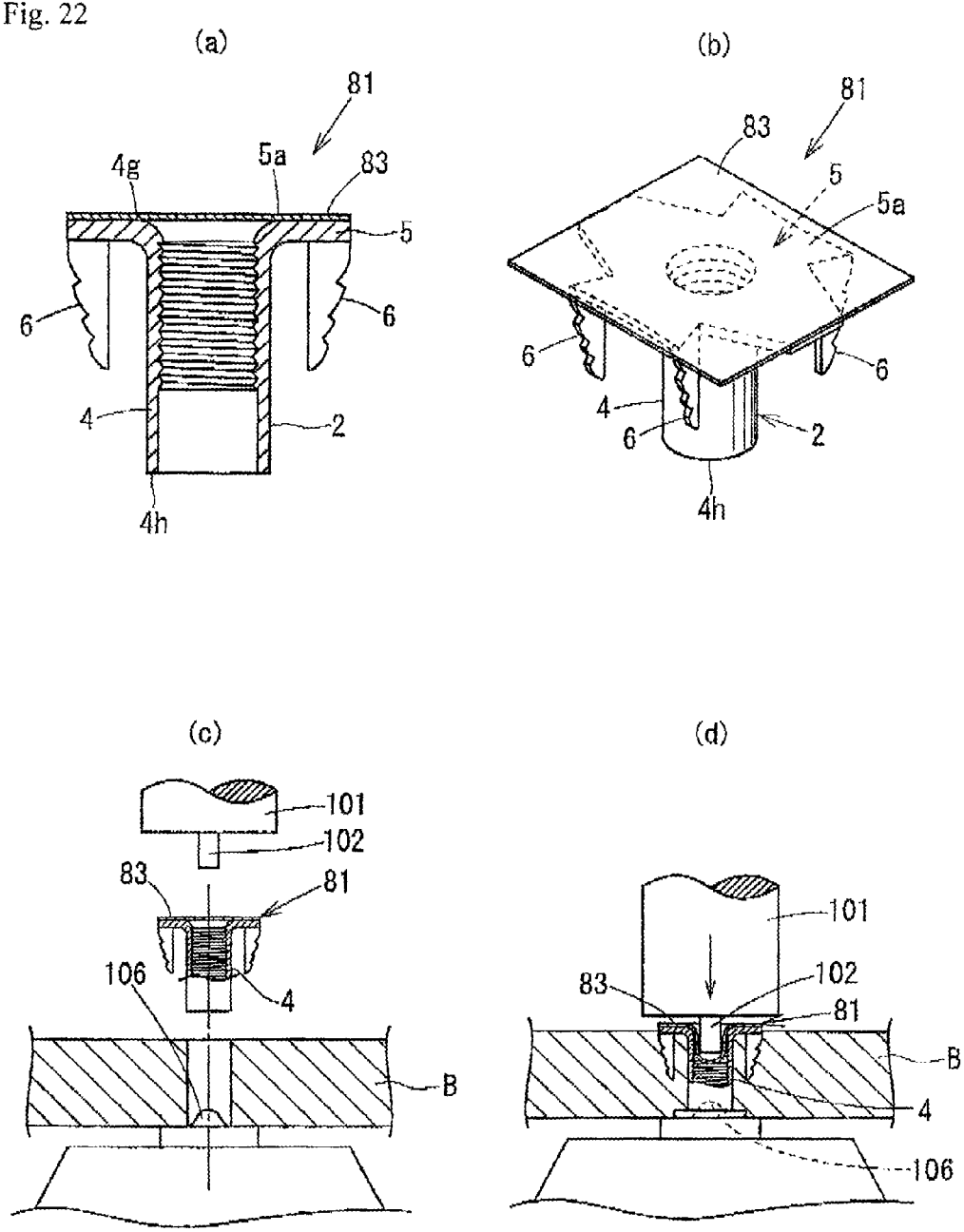
FIGS. 22A and 22B are, respectively, a vertical sectional view and a perspective view of a T-nut according to a ninth embodiment of the present invention.
FIGS. 22C and 22D are each a schematic view showing driving of the T-nut shown in FIG. 22A into, for example, a plate material using the driving device shown in FIGS. 4A and 4B.
Figure 23:
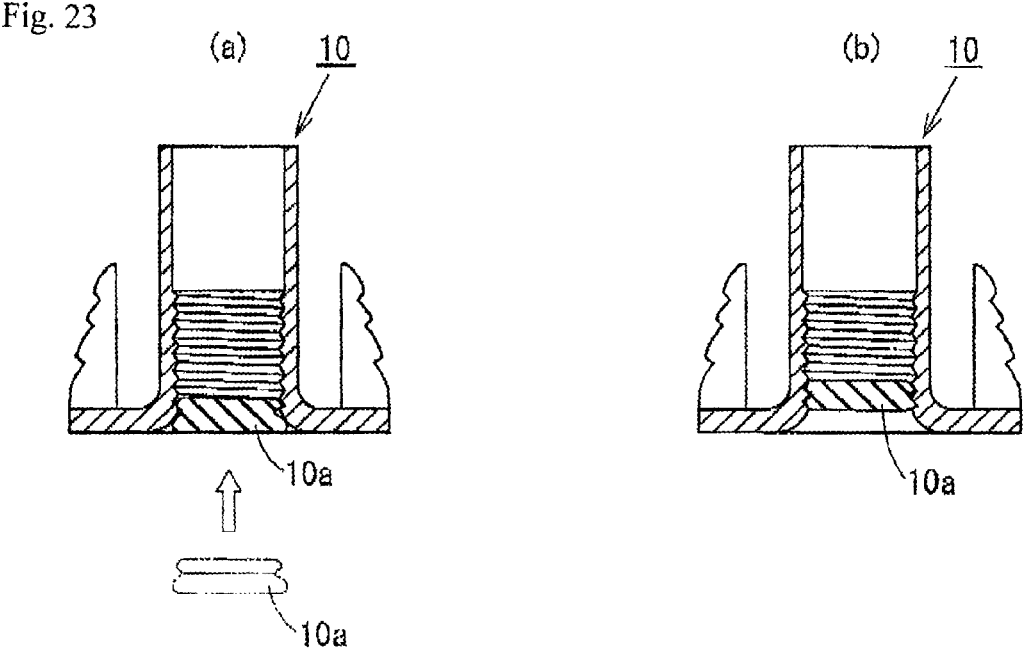
FIGS. 23A and 23B are each a vertical sectional view of a T-nut including a conventional sealing member.

As shown in FIGS. 22A and 22B, the sealing member 83 is a thin film having a rectangular shape in plan view, and is formed of elastomeric resin. The sealing member 83 is in close contact with an upper end surface 5a of a flange 5 so as to cover the entire upper end surface 5a of the flange 5. As long as the end surface 5a and the sealing member 83 are in close contact with each other without any gap around a first-end-portion-side opening of the shaft section 4, the entire surface or part of a portion where the sealing member 83 and the end surface 5a contact each other may be caused to adhere to each other. The sealing member 83 and the end surface 5a may be caused to adhere to each other by using an appropriate publicly known method in addition to an adhering method using an adhesive or a fusing (welding) method using high frequency or heat.

The material of the sealing member 83 is not particularly limited. Molten resin usable in the sealing member 3 according to the first embodiment may be used. It is desirable to use rubber such as natural rubber, polyisoprene, polybutadiene, styrene-butadiene copolymer, acrylonitrile-butadiene copolymer, ethylene-propylene-dien copolymer, ethylene-propylene copolymer, polychloroprene, isobutylene-isoprene copolymer, or silicone rubber.

FIGS. 22C and 22D show driving of the T-nut 81 according to the embodiment into a plate material (drive material) by the driving device 100. As shown in FIG. 22D, the sealing member 83 according to the ninth embodiment is formed of a resilient material having excellent stretchability and contractability. Therefore, the sealing member 83 is resiliently deformable so that the guide pin (external member) 102 that is inserted into the shaft section 4 from the first-end-portion side for preventing lateral displacement of the shaft section 4 when the T-nut 81 is driven into, for example, the plate material B is accommodated in the shaft section 4. More specifically, a portion of the sealing member 83 that covers the first-end-portion-side opening of the shaft section 4 is pressed by an end of the guide pin 102, and is resiliently deformed in the form of a substantially circular cylinder having a bottom so that the guide pin 102 moves into the shaft section 4, thereby making it possible for the guide pin 102 to move into the shaft section 4. In this way, the guide pin 102 prevents lateral displacement of the shaft section 4.

Figure 25:
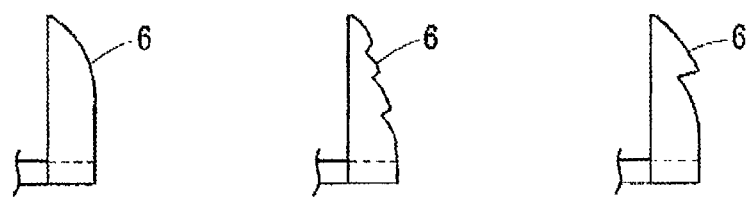
FIGS. 25A to 25C are partial side views of exemplary claws that may be used in the T-nut according to the present invention.

In the ninth embodiment, the T-nut body 2 is not limited to that described above. Any T-nut body which can be formed by a combination of a pawl, a flange, and a shaft section, in which any of the T-nut bodies according to the first to eighth embodiments, any of the T-nut bodies shown in FIGS. 21A to 21F, and any of the pawls shown in FIGS. 25A to 25C are arbitrarily selected, may be used as appropriate. In addition, any modification or improvement thereof may be used.

The T-nut according to the present invention is not limited to those according to the above-described embodiments, so that various modifications can be made. For example, in the first to eighth embodiments, an externally threaded long-andnarrow protruding portion may be provided up to the outer surface of the cover of the sealing member, or the outer periphery of a thin-film sealing member, such as that according to the ninth embodiment, may be brought into close contact with the inner peripheral surface of the shaft section. A portion of a thin-film sealing member (such as that according to the ninth embodiment) that covers the first-end-portion-side opening of the shaft section may have a circular cylindrical shape having a bottom so that the portion is fitted into the shaft section. Although the T-nut according to the present invention is suitable for being driven into, for example, a drive material with a driving device including a guide pin, it goes without saying that a driving tool or a driving device that does not include a guide pin may be used to drive the T-nut into the drive material.

As described above, the T-nut according to the present invention has high sealability. Therefore, the T-nut is suitable for being driven into, for example, a plate material which is immersed in oil or a coating for coating or surface treatment thereof or a plate material for forming polyurethane foam thereon. Since it is possible to suppress falling off of and displacement of the sealing member from the shaft section by bringing the guide pin into contact with the sealing member, the T-nut according to the present invention can be suitably used as a T-nut that is driven into, for example, a drive material using various types of driving devices and driving tools regardless of whether a guide pin is provided.

What is claimed is:

1. A T-nut comprising:
a cylindrical shaft section that is integrally formed using a metallic material, the shaft section having a first end portion and a second end portion opposite to the first end portion, the shaft section having a first-end-portion-side opening at the first end portion and a second-end-portion-side opening at the second end portion, the shaft section including an internal thread at an inner peripheral surface thereof;
a flange that extends outwardly from the first end portion of the shaft section; and
a sealing member that seals the first-end-portion-side opening of the shaft section, the sealing member being formed of elastomeric resin,
wherein the sealing member includes a circular cylindrical portion and a dome-shaped cover, the circular cylindrical portion closely contacting the inner peripheral surface of the shaft section and opening at a first-end-portion side, the dome-shaped cover being formed continuously to an edge of the circular cylindrical portion at a second-end-portion side, a top of the dome-shaped cover facing the second-end-portion side, an outer peripheral surface of the circular cylindrical portion having an externally threaded long-and-narrow protruding portion that seals a space at a root of the internal thread, and
wherein, when the flange at the first-end-portion side of the shaft section is defined as an upper side, and the second-end-portion side of the shaft section is defined as a lower side, an upper edge of the sealing member is positioned in a same plane as an upper end surface of the flange or is positioned below the upper end surface of the flange.

2. The T-nut according to claim 1, wherein the sealing member further includes an outer cylindrical portion that extends to the second-end-portion side from a second-end-portion-side edge of the circular cylindrical portion, and that surrounds an outer periphery of the cover,
wherein an outer peripheral surface of the outer cylindrical portion includes an externally threaded long-and-narrow protruding portion that seals the space at the root of the internal thread, and
wherein, when a bolt is screwed from the second-end-portion-side opening of the shaft section, the outer cylindrical portion is meshed between the internal thread and the bolt.

3. The T-nut according to claim 1, wherein the sealing member has a protrusion at an inner surface thereof.

4. The T-nut according to claim 1, wherein the cover of the sealing member has a protrusion at an outer surface thereof.

5. The T-nut according to claim 1, wherein the shaft section has a recessed portion at an outer peripheral surface thereof, the recessed portion being for causing a portion of the internal thread to be irregular.

6. The T-nut according to claim 1, wherein the flange includes a claw or a protrusion extending from the first end portion toward the second end portion.

7. The T-nut according to claim 1, wherein at least a portion of an outer peripheral edge of the flange is formed by a straight line as viewed from the first-end-portion side.

8. The T-nut according to claim 1, wherein the flange is circular or elliptical as viewed from the first-end-portion side.

9. The T-nut according to claim 1, wherein, as viewed from the first-end-portion side, the flange includes a substantially octagonal central portion, and a pair of extending portions that extend outwardly from a pair of end sides at the central portion opposing each other in a first radial direction of the shaft section with the shaft section at the central portion being interposed therebetween,
wherein, as viewed from the first-end-portion side, the extending portions each include a pair of straight sides, each straight side extending outwardly from an end of the corresponding end side, and a straight line or an inwardly curved side connecting outer end points of the corresponding straight sides,
wherein the extending portions of the flange include two pairs of claws, or a total of four claws,
wherein each pair of claws is formed so as to extend from the corresponding pair of straight sides to a/the second-end-portion side by cutting and raising an/the outer peripheral edge of the flange, and
wherein the four claws are symmetrically disposed in the first radial direction and a second radial direction that is orthogonal to the first radial direction with the shaft section 4 being disposed therebetween.

10. The T-nut according to claim 9, wherein, as viewed from the second-end-portion side, the two pairs of pawls, or the four pawls, are disposed so that two rows of claws, each row including two claws, are provided with a widthwise direction being substantially parallel to the first radial direction.

11. The T-nut according to claim 1, wherein the shaft section includes an intended-for-caulking portion at the second-end-portion side, the intended-for-caulking portion being intended to be caulked with respect to a drive material, the intended-for-caulking portion being thinner than a portion where the internal thread is formed in the inner peripheral surface of the shaft section.

12. The T-nut according to claim 1, wherein the shaft section includes, at the first-end-portion side, a diameter increasing portion where a diameter of an outer peripheral surface and/or the inner peripheral surface increases.

13. The T-nut according to claim 1, wherein the internal thread of the shaft section is formed along an entire length of the inner peripheral surface of the shaft section.

* * * * *